(12) United States Patent
Yin et al.

(10) Patent No.: US 11,979,873 B2
(45) Date of Patent: May 7, 2024

(54) PRIORITY DIFFERENTIATION OF SR TRANSMISSIONS WITH HARQ-ACK CODEBOOKS OF DIFFERENT SERVICE TYPES

(71) Applicant: SHARP KABUSHIKI KAISHA, Sakai (JP)

(72) Inventors: Zhanping Yin, Vancouver, WA (US); Tatsushi Aiba, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 322 days.

(21) Appl. No.: 17/622,614

(22) PCT Filed: Jun. 26, 2020

(86) PCT No.: PCT/JP2020/025243
§ 371 (c)(1),
(2) Date: Dec. 23, 2021

(87) PCT Pub. No.: WO2021/002292
PCT Pub. Date: Jan. 7, 2021

(65) Prior Publication Data
US 2022/0361199 A1 Nov. 10, 2022

Related U.S. Application Data

(60) Provisional application No. 62/869,481, filed on Jul. 1, 2019.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 27/2605* (2013.01); *H04W 72/569* (2023.01)

(58) Field of Classification Search
CPC ............ H04W 72/1268; H04W 72/569; H04L 1/1812; H04L 27/2605; H04L 1/1671; H04L 1/1861; H04L 5/0055
See application file for complete search history.

(56) References Cited

U.S. PATENT DOCUMENTS

| 2019/0215126 A1* | 7/2019 | Choi | H04L 1/1861 |
| 2020/0280427 A1* | 9/2020 | Liu | H04L 5/023 |
| 2021/0014854 A1* | 1/2021 | Gao | H04L 1/1671 |

OTHER PUBLICATIONS

3GPP TS 38.213 V15.6.0 (Jun. 2019) 3rd Generation Partnership Project; Technical Specification Group Radio Access Network; NR; Physical layer procedures for control (Release 15).
(Continued)

*Primary Examiner* — Dinh Nguyen
(74) *Attorney, Agent, or Firm* — ScienBiziP, P.C.

(57) ABSTRACT

A user equipment (UE) includes processing circuitry configured to: determine that up to 2 bits of a hybrid automatic repeat request-acknowledgment (HARQ-ACK)that are to be reported on a physical uplink control channel (PUCCH) resource configured for HARQ-ACK with PUCCH format 0, and at least one PUCCH resource configured for a scheduling request (SR) having a positive SR value overlapping with the PUCCH resource configured for HARQ-ACK with PUCCH format 0, determine a type of a HARQ-ACK codebook, determine a positive SR and a priority of the SR, and determine a PUCCH resource selected between the PUCCH resource configured for HARQ-ACK and the PUCCH resource configured for the SR, and a sequence with a value of cyclic shift (CS) on the selected PUCCH resource, the value of CS being determined based on the value of HARQ-ACK bits and the priority of the SR. The UE also includes transmitting circuity configured to transmit sequence with the value of CS on the selected PUCCH resource.

5 Claims, 8 Drawing Sheets

(51) Int. Cl.
*H04L 27/26* (2006.01)
*H04W 72/566* (2023.01)

(56) References Cited

OTHER PUBLICATIONS

3GPP TS 38.211 V15.6.0 (Jun. 2019) 3rd Generation Partnership Project; Technical Specification Group Radio Access Network; NR; Physical channels and modulation (Release 15).
Fujitsu, "UCI enhancements for URLLC", R1-1906583 3GPP TSG RAN WG1 #97, Reno, USA, May 13-17, 2019.
Oppo, "Summary#2 on UCI enhancements for URLLC", R1-1907777 3GPP TSG RAN WG1 #97, Reno, USA, May 13-17, 2019.
Huawei et al., "Remaining issues on PUCCH structure in short-duration", R1-1805884 3GPP TSG RAN WG1 Meeting #93, Busan, Korea, May 21-25, 2018.
Spreadtrum Communications, "Discussion on UCI enhancements for URLLC", R1-1904776 3GPP TSG RAN WG1 #96bis, Xi'an, China, Apr. 8-12, 2019.
Lopamudra Kundu et al., "Physical Uplink Control Channel Design for 5G New Radio", 2018.
Panasonic, "Discussion on PUCCH overlap issues", R1-1806180 3GPP TSG RAN WG1 Meeting #93, Busan, Korea, May 21-25, 2018.

\* cited by examiner

FIG. 2

```
-- ASN1START
-- TAG-SCHEDULING-REQUEST-RESOURCE-CONFIG-START

SchedulingRequestResourceConfig ::=    SEQUENCE {
    schedulingRequestResourceId           SchedulingRequestResourceId,
    schedulingRequestID                   SchedulingRequestId,
    periodicityAndOffset                  CHOICE {
        sym2                                  NULL,
        sym6or7                               NULL,
        sl1                                   NULL,           -- Recurs in every slot
        sl2                                   INTEGER (0..1),
        sl4                                   INTEGER (0..3),
        sl5                                   INTEGER (0..4),
        sl8                                   INTEGER (0..7),
        sl10                                  INTEGER (0..9),
        sl16                                  INTEGER (0..15),
        sl20                                  INTEGER (0..19),
        sl40                                  INTEGER (0..39),
        sl80                                  INTEGER (0..79),
        sl160                                 INTEGER (0..159),
        sl320                                 INTEGER (0..319),
        sl640                                 INTEGER (0..639)
    }
OPTIONAL,    -- Need M
    resource                              PUCCH-ResourceId
OPTIONAL     -- Need M
}

-- TAG-SCHEDULING-REQUEST-RESOURCE-CONFIG-STOP
-- ASN1STOP
```

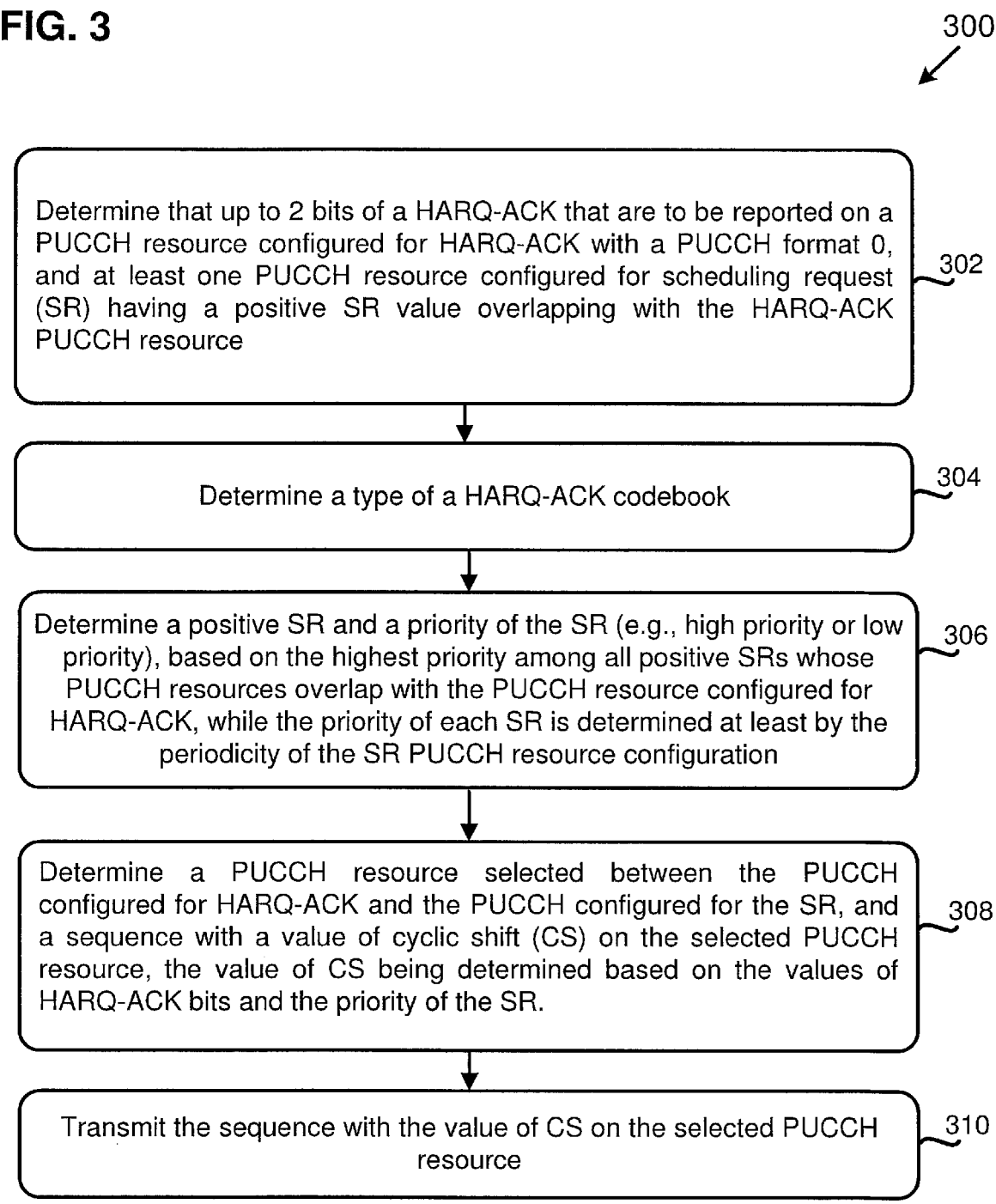

PRIORITY DIFFERENTIATION OF SR TRANSMISSIONS WITH HARQ-ACK CODEBOOKS OF DIFFERENT SERVICE TYPES

CROSS REFERENCE

This Nonprovisional application claims priority under 35 U.S.C. § 119 on provisional Application No. 62/869,481 on Jul. 1, 2019, the entire contents of which are hereby incorporated by reference.

TECHNICAL FIELD

The present disclosure generally relates to wireless communication, and more particularly, to priority differentiation of scheduling request (SR) transmissions with hybrid automatic repeat request-acknowledgment (HARQ-ACK) codebooks of different service types.

BACKGROUND ART

In the current 3rd Generation Partnership Project (3GPP) specifications, only one HARQ-ACK codebook per slot is supported. Also, SR priority is not considered at the physical (PHY) layer. As separate HARQ-ACK codebooks may be supported for different service types, and SR priority may be known to the UEs at the PHY layer, there is a need in the art to investigate methods of SR priority differentiation and indication over different HARQ-ACK codebooks to support the new features in the next generation (e.g., fifth generation (5G) new radio (NR)) wireless communication networks.

SUMMARY OF INVENTION

In one example, a user equipment (UE) comprising: processing circuitry configured to: determine that up to 2 bits of a hybrid automatic repeat request-acknowledgment (HARQ-ACK)that are to be reported on a physical uplink control channel (PUCCH) resource configured for HARQ-ACK with PUCCH format 0, and at least one PUCCH resource configured for a scheduling request (SR) having a positive SR value overlapping with the PUCCH resource configured for HARQ-ACK with PUCCH format 0; determine a type of a HARQ-ACK codebook; determine an SR with positive value and a priority of the SR; determine a PUCCH resource selected between the PUCCH resource configured for HARQ-ACK and the PUCCH resource configured for the SR; determine a sequence with a value of cyclic shift (CS) on the selected PUCCH resource, the value of CS being determined based on the value of HARQ-ACK bits and the priority of the SR; and transmitting circuity configured to transmit the sequence with the value of CS on the selected PUCCH resource.

In one example, a method by a user equipment (UE), the method comprising: determining, by processing circuitry, that up to 2 bits of a hybrid automatic repeat request-acknowledgment (HARQ-ACK)that are reported on a physical uplink control channel (PUCCH) configured for HARQ-ACK with PUCCH format 0, and at least one PUCCH resource configured for a scheduling request (SR) having a positive SR value overlapping with the PUCCH resource configured for HARQ-ACK with PUCCH format 0; determining, by the processing circuitry, a type of a HARQ-ACK codebook; determining, by the processing circuitry, a SR with positive value and a priority of the SR; determining, by the processing circuitry, a PUCCH resource selected between the PUCCH resource configured for HARQ-ACK and the PUCCH resource configured for the SR; determining, by the processing circuitry, a sequence with a value of cyclic shift (CS) on the selected PUCCH resource, the value of CS being determined based on the value of HARQ-ACK bits and the priority of the SR; transmitting, by transmitting circuity, the sequence with the value of CS on the selected PUCCH resource.

BRIEF DESCRIPTION OF DRAWINGS

Implementations of the present technology will now be described, by way of example only, with reference to the attached figures.

FIG. 2 shows a SchedulingRequestResourceConfig information element (IE).

FIG. 3 is a flowchart diagram illustrating a method of a UE, in accordance with example implementations of the present application.

DESCRIPTION OF EMBODIMENTS

Figure 1A:
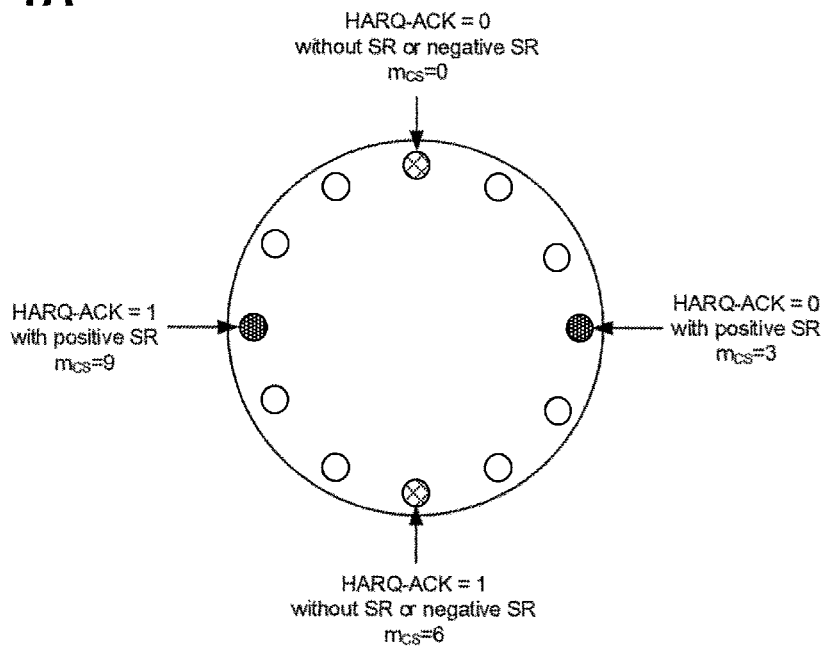
FIG. 1A is a diagram illustrating cyclic shifts for 1-bit of HARQ-ACK on PUCCH format 0 with positive SR or negative SR or without SR when the priority of SR is not differentiated.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

In various implementations of the present application, SR priority may be determined based on periodicity in the number of symbols or time duration. At least two levels of SR priority may be defined, for example, high priority and low priority.

In various implementations of the present application, when a positive SR is multiplexed with other uplink control information (UCI), such as a HARQ-ACK, the SR priority may also be indicated.

In various implementations of the present application, the SR multiplexing behavior may be different for different HARQ-ACK codebooks considering the priorities of both the HARQ-ACK codebook and SR priority.

In various implementations of the present application, the interplay between SR and HARQ-ACK with up to 2 bits on PUCCH format 0 is considered.

In various implementations of the present application, a PUCCH format 0 resource configured for HARQ-ACK is transmitted with different cyclic shifts (CSs) applied to positive SRs with different priorities. For example, for a positive SR with low priority, a cyclic shift over a HARQ-ACK PUCCH sequence is used, while another cyclic shift over a HARQ-ACK PUCCH sequence is used for a positive SR with high priority, where a different cyclic shift index is used to differentiate the SR with high priority from the SR with low priority. In one implementation, the CS index for a positive SR with high priority is increased by one over the CS index for a positive SR with low priority. In another implementation approach, a better CS constellation is used, so that the resulting set of CSs for an SR with low priority and an SR with high priority are closer to their corresponding CS for the HARQ-ACK bits.

In various implementations of the present application, different handling for different HARQ-ACK codebooks and SR priorities are described.

In one implementation, when a HARQ-ACK codebook is configured at slot level, the current cyclic shift method is used for a positive SR with low priority, while for a positive SR with high priority, the PUCCH configured for the SR with high priority is transmitted, and the PUCCH configured for the slot level HARQ-ACK is dropped and not transmitted. The HARQ-ACK bits may be carried on the PUCCH configured for the SR with high priority if resources are available (e.g., by applying cyclic shift on the SR PUCCH sequence). The slot level HARQ-ACK codebook is also known as legacy HARQ-ACK codebook, low priority HARQ-ACK codebook, HARQ-ACK codebook for eMBB, or HARQ-ACK codebook for a first service type, etc. The PUCCH resources for slot level HARQ-ACK codebook are also configured at slot level. Only one PUCCH carrying slot level HARQ-ACK can be transmitted in a slot.

In one implementation, when a HARQ-ACK codebook is configured at slot level, and the PUCCH configured for the slot level HARQ-ACK is transmitted with power boosting to indicate an SR with high priority. For example, a PUCCH configured for an SR with high priority may be configured with a higher transmit power than a PUCCH configured for an SR with low priority. For an SR with low priority, the PUCCH configured for the slot level HARQ-ACK is transmitted with the current cyclic shift method and the configured transmit power for the HARQ-ACK PUCCH. For an SR with high priority, the PUCCH configured for the slot level HARQ-ACK is transmitted with boosted transmission power to the configured transmit power for the PUCCH configured for an SR with high priority.

In one implementation, when a HARQ-ACK codebook is configured at subslot level, HARQ-ACK and SR multiplexing is not performed for SRs with low priority. Thus, if the PUCCH format 0 for subslot level HARQ-ACK overlaps with only SRs with low priority, the SR with low priority is dropped, only the PUCCH configured for subslot level HARQ-ACK is transmitted. If the PUCCH format 0 for subslot level HARQ-ACK overlaps with PUCCHs for SRs with high priority, the PUCCH configured for subslot level HARQ-ACK is transmitted with a cyclic shift indicating the SR by the existing methods. The subslot level HARQ-ACK codebook can be referred to as high priority HARQ-ACK codebook, HARQ-ACK codebook for URLLC, or HARQ-ACK codebook for a second service type, etc. The PUCCH resources for subslot level HARQ-ACK codebook are configured at subslot level. More than one PUCCH carrying subslot level HARQ-ACK can be transmitted in a slot.

In various implementations of the present application, no change of behavior on the UE side, while the base station may need to have different assumptions for different priorities. For example, the current cyclic shift method is used on the UE side, without SR differentiation. On the base station side, the base station may assume that among the SR(s) that overlap with the HARQ-ACK PUCCH, the SR with the highest priority is triggered.

The existing UE procedure for SR reporting is described below.

In Subclause 9.2.4 of TS 38.213 in Rel-15 of the 3GPP specification, UE procedure for reporting SR is provided, the content of Subclause 9.2.4 of TS 38.213 in Rel-15 is incorporated by reference in its entirely. A UE is configured by a higher layer parameter, SchedulingRequestResourceConfig, a set of configurations for SR in a PUCCH transmission using either PUCCH format 0 or PUCCH format 1. The UE is configured a PUCCH resource by higher layer parameter SchedulingRequestResourceId providing a PUCCH format 0 resource or a PUCCH format 1 resource as described in Subclause 9.2.1 in TS 38.213. The UE is also configured a periodicity $SR_{PERIODICITY}$ in symbols or slots and an offset $SR_{OFFSET}$ in slots by higher layer parameter periodicityAndOffset for a PUCCH transmission conveying SR. If $SR_{PERIODICITY}$ is larger than one slot, the UE determines SR transmission occasion in a PUCCH to be in a slot with number $n_{s,f}^{\mu}$ [TS 38.211] in a frame with number $n_f$ if $(n_f N_{slot}^{frame,\mu} + n_{s,f}^{\mu} - SR_{OFFSET})\bmod SR_{PERIODICITY} = 0$.

If $SR_{PERIODICITY}$ is one slot, the UE expects that $SR_{OFFSET}=0$ and every slot is SR transmission occasion in a PUCCH.

If $SR_{PERIODICITY}$ is smaller than one slot, the UE determines SR transmission occasion in a PUCCH to start in a symbol with index_1 [TS 38.211] if $(l-l_0 \bmod SR_{PERIODICITY}) \bmod SR_{PERIODICITY}=0$ where $l_0$ is the value of higher layer parameter startingSymbolIndex.

If the UE determines that, for SR transmission occasion in a PUCCH, the number of symbols available for the PUCCH transmission in a slot is smaller than the value provided by higher layer parameter nrofSymbols, the UE does not transmit the PUCCH in the slot.

SR transmission occasions in a PUCCH are subject to the limitations for UE transmissions described in Subclause 11.1 and Subclause 11.1.1 of TS38.213.

The UE transmits a PUCCH in the PUCCH resource for the corresponding SR configuration only when the UE transmits a positive SR. For a positive SR transmission using PUCCH format 0, the UE transmits the PUCCH as described in [TS 38.211] by obtaining $m_0$ as described for HARQ-ACK information in Subclause 9.2.3 of TS 38.213 and by setting $m_{cs}=0$. For a positive SR transmission using PUCCH format 1, the UE transmits the PUCCH as described in [TS 38.211] by setting $b(0)=0$.

In Subclause 9.2.5.1 of TS 38.213 in Rel-15 of the 3GPP specification, UE procedure for multiplexing HARQ-ACK or CSI and SR in a PUCCH is provided, the content of Subclause 9.2.5.1 of TS 38.213 in Rel-15 is incorporated by reference in its entirely. A UE is configured to transmit PUCCHs for respective SRs in a slot, as determined by a set of higher layer parameters schedulingRequestResourceId, with SR transmission occasions that would overlap with a transmission of a PUCCH with HARQ-ACK information from the UE in the slot or with a transmission of a PUCCH with periodic/semi persistent CSI transmission from the UE in the slot.

If a UE would transmit a PUCCH with positive SR and at most two HARQ-ACK information bits in a resource using PUCCH format 0, the UE transmits the PUCCH in the resource using PUCCH format 0 in PRB(s) for HARQ-ACK information as described in Subclause 9.2.3 of TS 38.213. The UE determines a value of $m_0$ and $m_{cs}$ for computing a value of cyclic shift α [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 9.2.5-1 and Table 9.2.5-2, respectively.

If the UE would transmit negative SR and a PUCCH with at most two HARQ-ACK information bits in a resource using PUCCH format 0, the UE transmits the PUCCH in the resource using PUCCH format 0 for HARQ-ACK information as described in Subclause 9.2.3 of TS 38.213.

TABLE 9.2.5-1

Mapping of values for one HARQ-ACK information bit and positive SR to sequences for PUCCH format 0

| HARQ-ACK Value | 0 | 1 |
| --- | --- | --- |
| Sequence cyclic shift | $m_{CS}=3$ | $m_{CS}=9$ |

TABLE 9.2.5-2

Mapping of values for two HARQ-ACK information bits and positive SR to sequences for PUCCH format 0

| HARQ-ACK Value | {0, 0} | {0, 1} | {1, 1} | {1, 0} |
| --- | --- | --- | --- | --- |
| Sequence cyclic shift | $m_{cs}=1$ | $m_{cs}=4$ | $m_{cs}=7$ | $m_{cs}=10$ |

In Subclauses 6.3.2.1 to 6.3.2.3 of TS 38.211 in Rel-15 of the 3GPP specification, different formats of PUCCH, sequence and cyclic shift hopping, and PUCCH format 0 sequence generation and physical resource mapping are described. The content of Subclauses 6.3.2.1 to 6.3.2.3 of TS 38.211 in Rel-15 is incorporated by reference in its entirely.

In the current 3GPP specification, only one HARQ-ACK codebook is supported per slot. Multiple SR configurations may be configured for a UE. Each SR configuration may be linked to a different traffic type or service. An SR configuration may include an SR PUCCH format and resource, a periodicity and an offset within the periodicity. Since SR only carries one bit, an SR PUCCH resource may be configured with PUCCH format 0 or PUCCH format 1.

Only positive SRs are reported on an PUCCH configured for SR. If a PUCCH resource configured for SR overlaps with a PUCCH resource configured for up to 2 bits of HARQ-ACK with format 0, the SR is multiplexed on the PUCCH resource configured for HARQ-ACK by applying a cyclic shift on the PUCCH sequence over the cyclic shift of HARQ-ACK bits for positive SR.

Figure 1B:
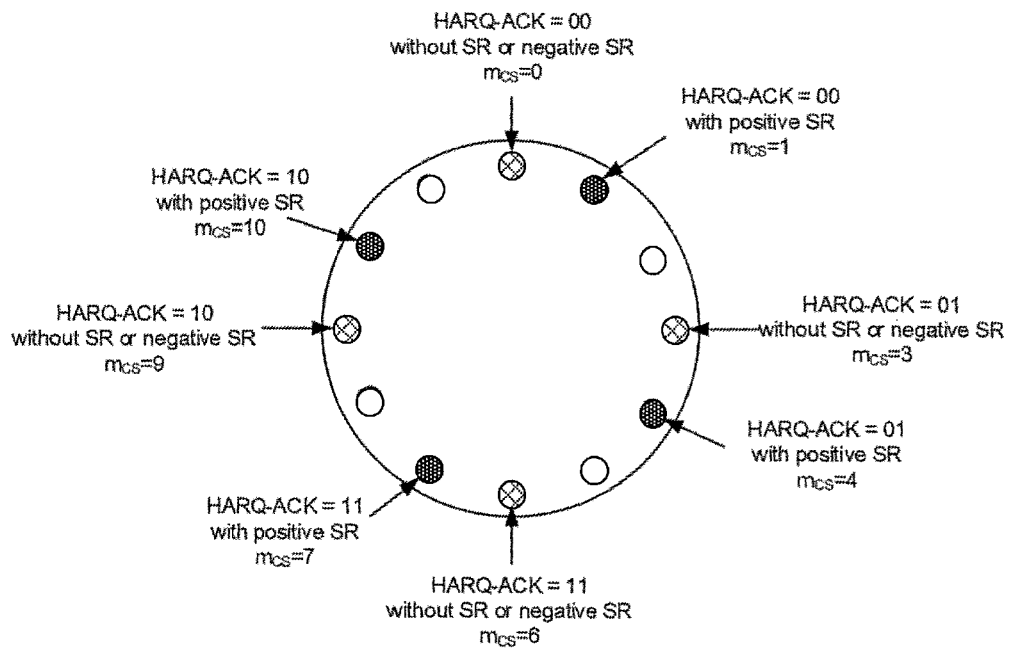
FIG. 1B is a diagram illustrating cyclic shifts for 2-bit of HARQ-ACK on PUCCH format 0 with positive SR or negative SR or without SR when the priority of SR is not differentiated.

FIG. 1A is a diagram illustrating cyclic shifts for 1-bit of HARQ-ACK on PUCCH format 0 with positive SR or negative SR or without SR when the priority of SR is not differentiated. FIG. 1B is a diagram illustrating cyclic shifts for 2-bit of HARQ-ACK on PUCCH format 0 with positive SR or negative SR or without SR when the priority of SR is not differentiated. FIGS. 1A and 1B illustrate the current cyclic shift methods for HARQ-ACK and SR multiplexing on PUCCH format 0 for 1-bit of HARQ-ACK and 2-bit of HARQ-ACK, respectively.

In the following, differentiation of HARQ-ACK codebooks and SR priorities and related issues are described.

In the next generation (e.g., 5G NR) wireless communication networks, different service types are supported, (e.g. enhanced mobile broadband (eMBB) and ultra-reliable and low latency (URLLC)). In various implementation of the present application, at least two HARQ-ACK codebooks may be simultaneously constructed for different service types.

For example, Radio Network Temporary Identifier (RNTI) and/or downlink control information (DCI) in downlink (DL) assignment may be used for identifying PDSCHs for different service types (e.g., an eMBB PDSCH and a URLLC PDSCH). In another example, RNTI and/or DCI in DL assignment may be used for identifying HARQ-ACK codebooks for different service types (e.g., a slot level or a slot-based HARQ-ACK codebook for an eMBB PDSCH, a subslot level or sub-slot-based HARQ-ACK codebook for a URLLC service type, etc.).

In various implementation of the present application, prioritization (e.g., lower priority and higher priority) is supported for PUSCH transmission for different service types. For example, RNTI and/or DCI in UL grant may be used for identifying PUSCHs for different service types (e.g., an eMBB PUSCH and a URLLC PUSCH).

In various implementation of the present application, one of the HARQ-ACK codebooks may be slot based HARQ- ACK feedback (e.g., for eMBB services as in Rel-15). Another HARQ-ACK codebook may be intended for low latency feedback with PUCCH resources configured at subslot level.

When at least two HARQ-ACK codebooks are simultaneously constructed for supporting different service types for a UE, all Rel-16 parameters in the PUCCH configuration related to HARQ-ACK feedback may be separately configured for different HARQ-ACK codebooks. The PUCCH resources for slot level HARQ-ACK should be configured at slot level, and the PUCCH resources for subslot level HARQ-ACK should be configured separately in subslot level.

In various implementation of the present application, SR priority is known to the UE at the physical layer.

In Rel-15, there is no priority differentiation for either HARQ-ACK codebook or SR. With separate HARQ-ACK codebooks and known SR priority at the PHY layer, the SR transmission, especially SR multiplexing with other UCI need to be enhanced based on the HARQ-ACK and SR priorities.

In various implementation of the present application, the case of SR multiplexing with HARQ-ACK up to 2 bits on PUCCH format 0 is studied, and new methods to differentiate the SR priority considering different HARQ-ACK codebooks are demonstrated.

In the following, the methods for determining an SR priority are described.

In various implementation of the present application, SR priority may be determined based on the periodicity in the SR resource configuration. FIG. 2 shows a SchedulingRequestResourceConfig information element (IE). The SchedulingRequestResourceConfig IE determines physical layer resources on PUCCH where the UE may send the dedicated scheduling request (D-SR) (see TS38.213, section 9.2.4).

priority. The threshold value may be fixed in the specification. The threshold value may be configured by higher layer signaling (e.g., RRC signaling). A set of values may be configured, and the index of the configured value may be indicated to UE.

For example, if $SR_{PERIODICITY}$ is larger than or equal to one slot, the SR is an SR with low priority. If $SR_{PERIODICITY}$ is smaller than one slot, e.g. 2 symbols, 6 or 7 symbols, the SR is an SR with high priority. However, for a high sub-carrier spacing (SCS) setting, a PUCCH with one slot or more can still be very short. In such a case, the threshold may be specified/configured depending on each SCS. The UE may determine the threshold value based on the SCS configured for uplink (UL) bandwidth part (BWP) for SR transmission (e.g., a UL BWP where a PUCCH resource configured for SR is configured).

In another example method according to an implementation of the present application, SR priority may be determined based on time duration. For example, the SR priority may be determined based on the PUCCH duration of the SR resource. For example, when the SR periodicity (e.g., $SR_{PERIODICITY}$) is less than or equal to 0.5 ms (Periodicity ≤0.5 ms), the SR may be considered as an SR with high priority. In other examples, the periodicity may also be defined based on the number of symbols.

A threshold value of a time duration can be specified to determine the SR priority. In one example, the threshold value may be fixed in the specification. In another example, the threshold value may be configured by higher layer signaling (e.g., RRC signaling). In yet another example, a set of values may be configured, and one or more indices of the corresponding one or more configured values may be indicated to the UE.

| SchedulingRequestResourceConfig field descriptions |
|---|
| periodicityAndOffset |
| SR periodicity and offset in number of slots. Corresponds to L1 parameter 'SR-periodicity' and 'SR-offset' |
| (see 38.213, section 9.2.2). The following periodicities may be configured depending on the chosen subcarrier spacing: |
| SCS = 15 kHz: 2sym, 7sym, 1sl, 2sl, 4sl, 5sl, 8sl, 10sl, 16sl, 20sl, 40sl, 80sl |
| SCS = 30 kHz: 2sym, 7sym, 1sl, 2sl, 4sl, 8sl, 10sl, 16sl, 20sl, 40sl, 80sl, 160sl |
| SCS = 60 kHz: 2sym, 7sym/6sym, 1sl, 2sl, 4sl, 8sl, 16sl, 20sl, 40sl, 80sl, 160sl, 320sl |
| SCS = 120 kHz: 2sym, 7sym, 1sl, 2sl, 4sl, 8sl, 16sl, 40sl, 80sl, 160sl, 320sl, sl640 |
| sym6or7 corresponds to 6 symbols if extended cyclic prefix and a SCS of 60 kHz are configured, |
| otherwise it corresponds to 7 symbols. |
| For periodicities sym2, sym7 and sl1 the UE assumes an offset of 0 slots. |
| resource |
| ID of the PUCCH resource in which the UE shall send the scheduling request. The actual PUCCH-Resource is |
| configured in PUCCH-Config of the same UL BWP and serving cell as this SchedulingRequestResourceConfig. |
| The network configures a PUCCH-Resource of PUCCH-format0 or PUCCH-format1 (other formats not supported). |
| Corresponds to L1 parameter 'SR-resource' (see 38.213, section 9.2.2) |
| schedulingRequestID |
| The ID of the SchedulingRequestConfig that uses this scheduling request resource. |

In one example method according to an implementation of the present application, SR priority may be determined based on the number of symbols. The UE is configured a periodicity $SR_{PERIODICITY}$ in symbols or slots and an offset $SR_{OFFSET}$ in slots by higher layer parameter periodicityAndOffset for a PUCCH transmission conveying SR. A threshold value of a number of symbols can be specified to determine the SR For example, if the SR PUCCH duration is greater than 0.5 ms (or 0.25 ms), the SR is an SR with low priority. When the SR periodicity (e.g., $SR_{PERIODICITY}$) is less than or equal to 0.5 ms (or 0.25 ms), the SR may be considered as an SR with high priority. Thus, for different high SCS settings, the number of symbols and slots can be different for an SR to be classified into an SR with high priority. For example, for a SCS of 60 kHz, an SR having a periodicity (e.g., $SR_{PERIODICITY}$) of 1 or 2 slots can still be considered an SR with high priority.

In yet another example method according to an implementation of the present application, SR priority may be indicated by higher layer signaling. For example, an SR priority may be explicitly indicated in an SR configuration. The SR priority may be determined based on the parameters in an SR PUCCH configuration. For example, an SR with high priority may be configured with enhanced PUCCH formats (e.g., more than one RB allocation, high transmit power, multiple sequences or cyclic shifts associated with one SR PUCCH resource).

For an SR with low priority, only one resource is configured with a sequence and a cyclic shift. Thus, up to twelve SR resources may be configured within one resource block (RB) with the same sequence and different cyclic shifts. An SR with high priority may be configured with a sequence and a cyclic shift, but multiple cyclic shifts associated with the given cyclic shift may be reserved. For example, the configured cyclic shift plus 3, 6, 9 may be reserved and not assigned to any other SRs or PUCCHs in the same physical resource block (PRB). Thus, up to 3 SR with high priority may be configured in a RB with the same sequence and different cyclic shifts. And, an SR with high priority is essentially configured with multiple cyclic shift resources.

In some implementations of the present application, SR priority may be limited to two general categories (or levels), a first priority or high priority, and a second priority or low priority. Furthermore, multiple levels of priorities within each category may be further specified. For example, for different URLLC services, different SR configurations within the SR with high priority category may be applied.

In the following, the methods of reporting HARQ-ACK and SR are described when at least one PUCCH configured for SR overlaps with a PUCCH configured for HARQ-ACK up to 2 bits with PUCCH Format 0.

In various implementations of the present application, in case of a PUCCH for HARQ-ACK overlaps with a PUCCH for SR, and when a positive SR is multiplexed with other UCI (e.g. HARQ-ACK), the SR priority may also be indicated. Furthermore, the SR multiplexing behavior may be different for different HARQ-ACK codebooks considering the priorities of both HARQ-ACK codebook and SR priority.

Various implementations of the present application focus the collision between of PUCCH resource for SR and PUCCH resource for HARQ-ACK with up to 2 bits on PUCCH format 0. For example, a PUCCH resource configured for an SR having a positive SR value (e.g., an SR PUCCH resource) overlaps with a PUCCH format 0 configured for up to 2 bits of HARQ-ACK transmission (e.g., a HARQ-ACK PUCCH resource).

A UE is configured to transmit PUCCHs for respective SRs in a slot or subslot, as determined by a set of higher layer parameters schedulingRequestResourceId, with SR transmission occasions that would overlap with a transmission of a PUCCH with HARQ-ACK information from the UE in the slot or subslot or with a transmission of a PUCCH with periodic/semi persistent CSI transmission from the UE in the slot or subslot.

For SR multiplexing with up to 2 bits of HARQ-ACK on PUCCH format 0, only one bit of SR is reported. A negative SR is generated if all of the SRs whose PUCCH resources overlap with the PUCCH format 0 resource configured for HARQ-ACK are negative. A positive SR is generated if any of the SR whose PUCCH resource overlaps with the PUCCH format 0 resource configured for HARQ-ACK is positive. The priority of the positive SR is determined by the highest priority among all positive SRs whose PUCCH resources overlap with the PUCCH format 0 resource configured for HARQ-ACK, and the PUCCH resource for the positive SR refers to the PUCCH resource of the determined SR with the highest priority among all positive SRs whose PUCCH resources overlap with the PUCCH format 0 resource configured for HARQ-ACK. Therefore, if all positive SR(s) are SR with low priority, a positive SR with low priority should be reported. If any of the positive SR(s) is an SR with high priority, a positive SR with high priority should be reported.

For the reporting of the resulting positive SR with up to 2 bits of HARQ-ACK on PUCCH format 0, several methods are described below.

FIG. 3 is a flowchart diagram illustrating a method of a UE, in accordance with example implementations of the present application. In FIG. 3, flowchart 300 includes actions 302, 304, 306, 308, and 310. In action 302, the UE may determine, by processing circuitry, that up to 2 bits of a HARQ-ACK that are to be reported on a HARQ-ACK PUCCH resource configured with a PUCCH Format 0, and at least one scheduling request (SR) PUCCH resource with an SR having a positive value overlapping with the HARQ-ACK PUCCH resource. In action 304, the UE may determine, by the processing circuitry, a type of a HARQ-ACK codebook. In action 306, the UE may determine, by the processing circuitry, a positive SR and a priority of the positive SR. The priority of the positive SR is determined based on the highest priority among all positive SRs whose PUCCH resources overlap with the HARQ-ACK PUCCH resource, while the priority of each SR is determined at least by the periodicity of the SR PUCCH resource configuration. The priority of an SR may be considered as either a first priority or a second priority. For example, the SR having the first priority is an SR with high priority, while the SR with the second priority is an SR with low priority. In action 308, the UE may determine, by the processing circuitry, a PUCCH resource selected between the PUCCH configured for HARQ-ACK and the PUCCH configured for the positive SR, and a sequence with a value of cyclic shift (CS) on the selected PUCCH resource, the value of CS being determined based on the value of HARQ-ACK bits and the priority of the positive SR. In action 310, the UE may transmit, by transmitting circuity, the sequence with the value of CS on the selected PUCCH resource.

In one method (Method 1), different cyclic shifts may be applied to a positive SR with low priority and a positive SR with high priority.

Figure 4:
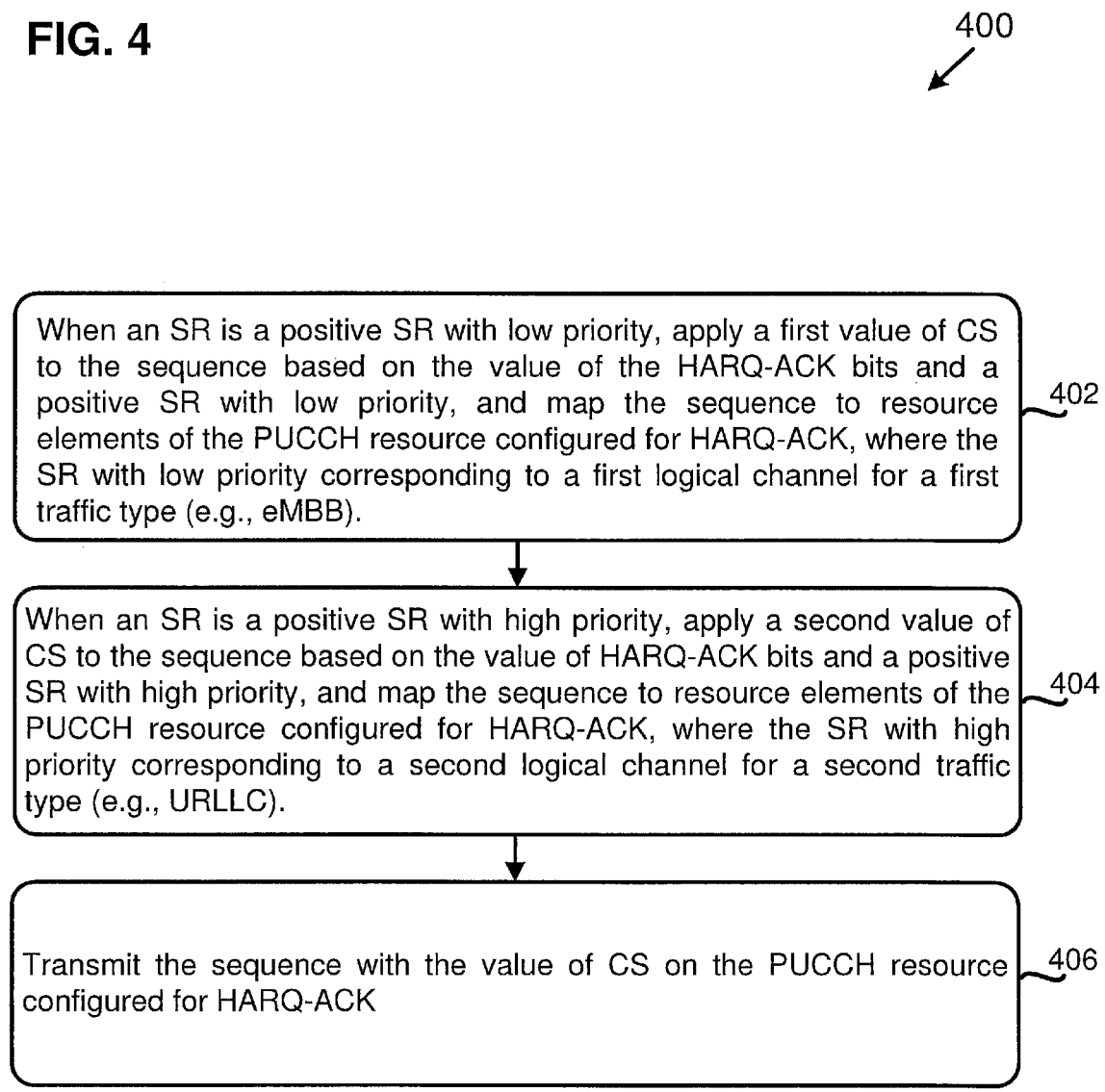
FIG. 4 is a flowchart diagram illustrating a detailed method of a UE to indicate an SR priority, in accordance with example implementations of the present application.

FIG. 4 is a flowchart diagram illustrating a detailed method of a UE to indicate an SR priority, in accordance with example implementations of the present application. In FIG. 4, flowchart 400 includes actions 402, 404, and 406. In action 402, when the UE determines, by processing circuitry, that the positive SR is an SR with low priority, the UE may apply, by processing circuitry, a first value of CS to the sequence based on the values of the HARQ-ACK bits and a positive SR with low priority, and map the sequence to resource elements of the PUCCH resource configured for HARQ-ACK. For example, an SR with low-priority may correspond to a first logical channel for a first traffic type (e.g., eMBB).

In action 404, when the UE determines, by processing circuitry, that the positive SR is an SR with high priority, the UE may apply, by processing circuitry, a second value of CS to the sequence based on values of HARQ-ACK bits and a positive SR with high priority, and map the sequence to resource elements of the PUCCH resource configured for HARQ-ACK. For example, an SR with high priority may correspond to a second logical channel for a second traffic type (e.g., URLLC).

In action 406, the UE may transmit, by transmitting circuitry, the sequence with the value of CS on the PUCCH resource configured for HARQ-ACK.

For a positive SR with low priority, the existing method of cyclic shift over HARQ-ACK PUCCH sequence may be used. In one implementation, for a positive SR with high priority, the cyclic shift index may be increased by one over the cyclic shift for a positive SR with low priority.

This additional cyclic shift can be a part of the UE's capability. For example, the UE may transmit, by using higher layer signaling, capability information used for indicating that the UE supports the additional cyclic shift and/or SR priority. Also, the base station (e.g., a gNB) may transmit, by using higher layer signaling, information used for indicating the additional cyclic shift and/or SR priority is allowed (e.g., performed). For legacy UEs that do not support SR priority at the PHY layer, the current method is used without change. For UEs that support SR priority at the PHY layer, the additional cyclic shift is used when a positive SR with high priority is reported.

In one implementation, to transmit a PUCCH with a positive SR with a low priority and at most two HARQ-ACK information bits in a resource using PUCCH format 0, a UE may transmit the PUCCH in the resource using PUCCH format 0 in PRB(s) for HARQ-ACK information as described in Subclause 9.2.3 of TS 38.213. The UE may determine a value of $m_0$ and $m_{cs}$ for computing a value of cyclic shift $\alpha$ [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 1 and Table 2, respectively.

TABLE 1

Mapping of values for one HARQ-ACK information bit and positive SR with low priority to sequences for PUCCH format 0

| HARQ-ACK Value | 0 | 1 |
|---|---|---|
| Sequence cyclic shift | $m_{cs} = 3$ | $m_{cs} = 9$ |

TABLE 2

Mapping of values for two HARQ-ACK information bits and positive SR with low priority to sequences for PUCCH format 0

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

In one implementation, to transmit a PUCCH with a positive SR with a high priority and at most two HARQ-ACK information bits in a resource using PUCCH format 0, the UE may transmit the PUCCH in the resource using PUCCH format 0 in PRB(s) for HARQ-ACK information as described in Subclause 9.2.3 of TS 38.213. The UE may determine a value of $m_0$ and $m_{cs}$ for computing a value of cyclic shift $\alpha$ [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 3 and Table 4, respectively.

TABLE 3

Mapping of values for one HARQ-ACK information bit and positive SR with high priority to sequences for PUCCH format 0

| HARQ-ACK Value | 0 | 1 |
|---|---|---|
| Sequence cyclic shift | $m_{cs} = 4$ | $m_{cs} = 10$ |

TABLE 4

Mapping of values for two HARQ-ACK information bits and positive SR with high priority to sequences for PUCCH format 0

| HARQ-ACK Value | {0, 0} | {0, 1} | {1, 1} | {1, 0} |
|---|---|---|---|---|
| Sequence cyclic shift | $m_{cs} = 2$ | $m_{cs} = 5$ | $m_{cs} = 8$ | $m_{cs} = 11$ |

In one implementation, to transmit a negative SR and a PUCCH with at most two HARQ-ACK information bits in a resource using PUCCH format 0, the UE may transmit the PUCCH in the resource using PUCCH format 0 for HARQ-ACK information as described in Subclause 9.2.3 of TS 38.213.

Figure 5A:
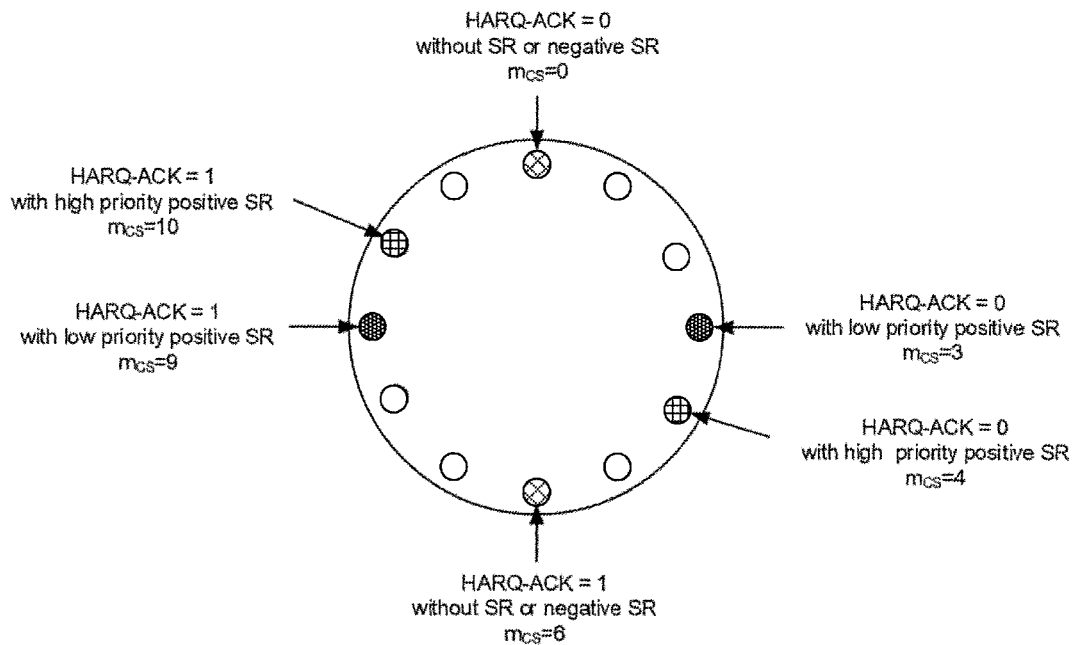
FIG. 5A is a diagram illustrating cyclic shifts for 1-bit of HARQ-ACK on PUCCH format 0 with different SR status and priorities or without SR, in accordance with example implementations of the present application.

FIG. 5A is a diagram illustrating cyclic shifts for 1-bit of HARQ-ACK on PUCCH format 0 with different SR status and priorities or without SR, in accordance with example implementations of the present application. FIG. 5A shows cyclic shifts for 1-bit HARQ-ACK on PUCCH format 0 with positive SR with different priorities, where one cyclic shift is added to the cyclic shift for a positive SR with low priority to indicate a positive SR with high priority.

Figure 5B:
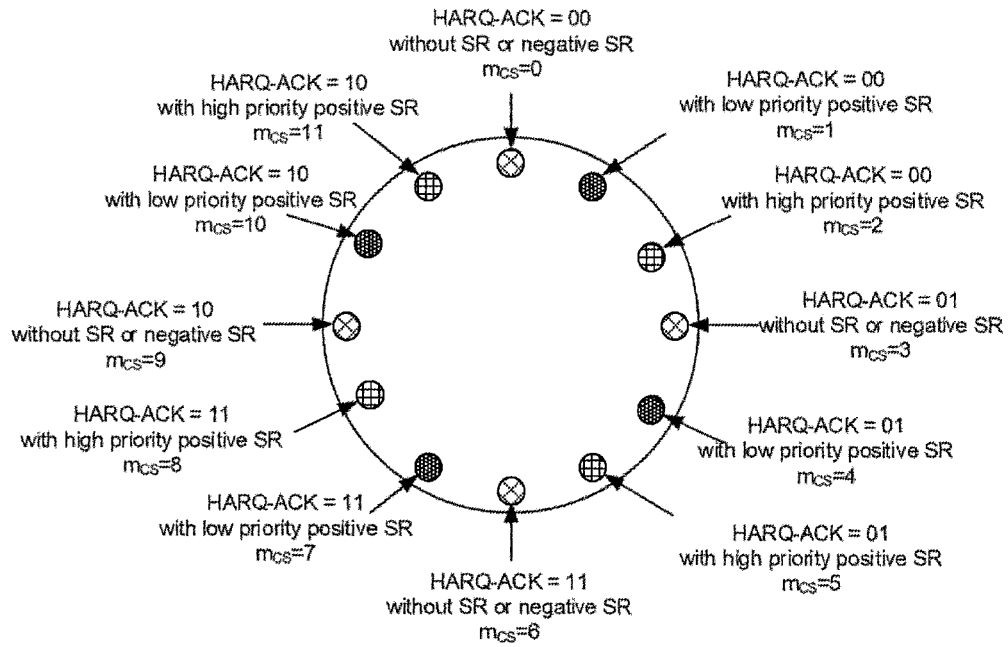
FIG. 5B is a diagram illustrating cyclic shifts for 2-bit of HARQ-ACK on PUCCH format 0 with different SR status and priorities or without SR, in accordance with example implementations of the present application.

FIG. 5B is a diagram illustrating cyclic shifts for 2-bit of HARQ-ACK on PUCCH format 0 with different SR status and priorities or without SR, in accordance with example implementations of the present application. FIG. 5B shows cyclic shifts for 2-bit HARQ-ACK on PUCCH format 0 with positive SR with different priorities, where one cyclic shift is added to the cyclic shift for an SR with low priority positive to indicate a positive SR with high priority.

Figure 6A:
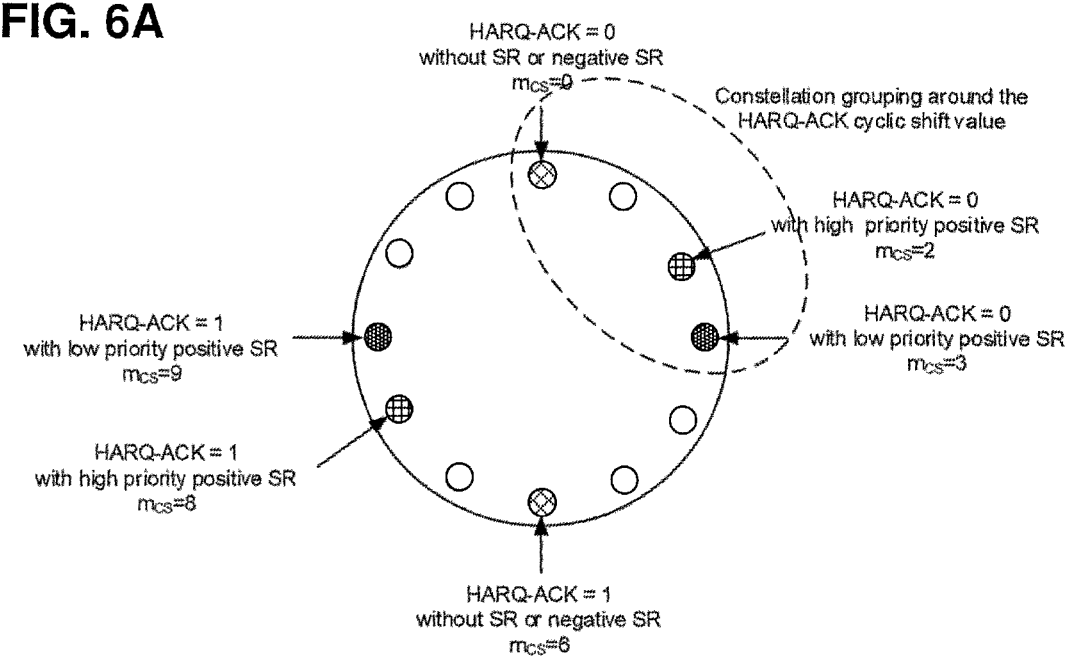
FIG. 6A is a diagram illustrating enhanced cyclic shift mapping with close cyclic shift constellation mapping with cyclic shifts for 1-bit of HARQ-ACK on PUCCH format 0 with different SR status and priorities or without SR, in accordance with example implementations of the present application.
Figure 6B:
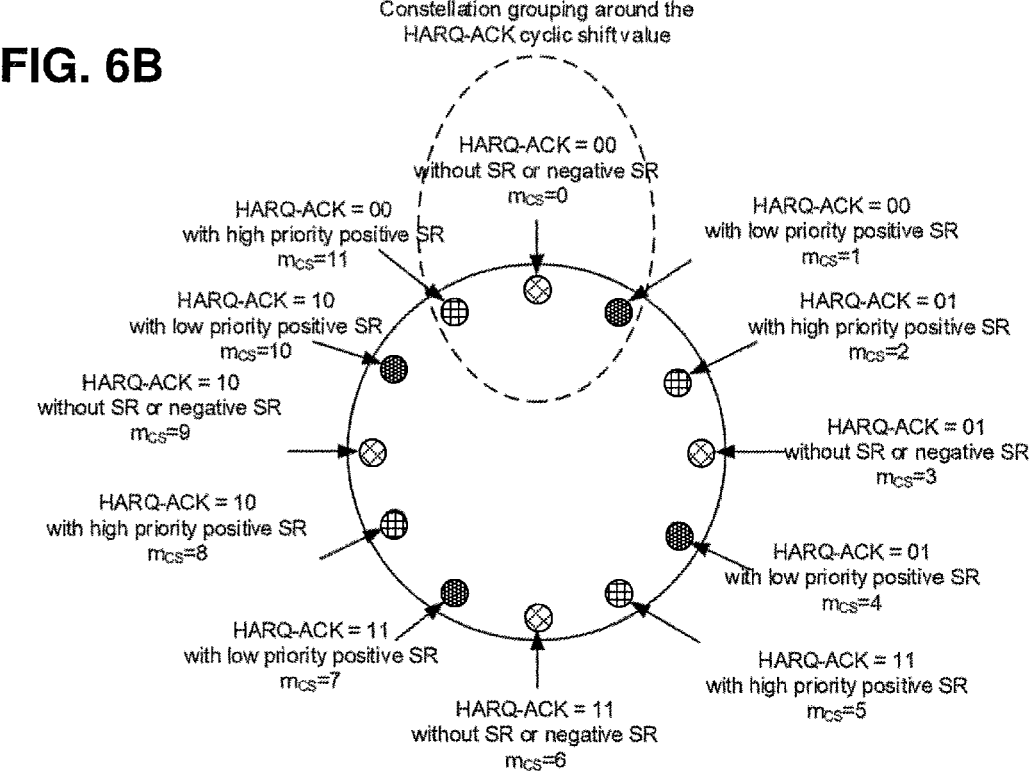
FIG. 6B is a diagram illustrating enhanced cyclic shift mapping with close cyclic shift constellation mapping with cyclic shifts for 2-bit of HARQ-ACK on PUCCH format 0 with different SR status and priorities or without SR, in accordance with example implementations of the present application.

The resulting constellation set of cyclic shifts for SR with high priority may move further away from the cyclic shift indicating the corresponding HARQ-ACK value, and become closer the other HARQ-ACK value(s). Thus, the HARQ-ACK detection performance may be affected. To better protect the HARQ-ACK performance, a method resulting in the cyclic shifts constellation being closer to the HARQ-ACK constellation without SR is shown in FIGS. 6A and 6B. FIG. 6A is a diagram illustrating enhanced cyclic shift mapping with close cyclic shift constellation mapping with cyclic shifts for 1-bit of HARQ-ACK on PUCCH format 0 with different SR status and priorities or without SR, in accordance with example implementations of the present application.

FIG. 6B is a diagram illustrating enhanced cyclic shift mapping with close cyclic shift constellation mapping with cyclic shifts for 2-bit of HARQ-ACK on PUCCH format 0 with different SR status and priorities or without SR, in accordance with example implementations of the present application.

In FIG. 6A, for a positive SR with high priority on a PUCCH with 1 bit of HARQ-ACK, the cyclic shift index of the positive SR with high priority is decreased by one from the cyclic shift index for a positive SR with low priority, i.e. the cyclic shift index for the positive SR with high priority is increased by 2 from the cyclic shift index representing the HARQ-ACK value without SR or with negative SR.

In FIG. 6B, for a positive SR with high priority on a PUCCH with 2 bits of HARQ-ACK, the cyclic shift index of the positive SR with high priority is decreased by one from the cyclic shift index representing the HARQ-ACK value without SR or with negative SR.

In one implementation, to transmit a PUCCH with a positive SR with a high priority and at most two HARQ-ACK information bits in a resource using PUCCH format 0, the UE may transmit the PUCCH in the resource using PUCCH format 0 in PRB(s) for HARQ-ACK information as described in Subclause 9.2.3 of TS 38.213. The UE may determine a value of $m_0$ and $m_{cs}$ for computing a value of cyclic shift α [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 5 and Table 6, respectively.

TABLE 5

Mapping of values for one HARQ-ACK information bit and positive SR with high priority to sequences for PUCCH format 0

| HARQ-ACK Value | 0 | 1 |
|---|---|---|
| Sequence cyclic shift | $m_{cs} = 2$ | $m_{cs} = 8$ |

TABLE 6

Mapping of values for two HARQ- ACK information bits and positive SR with high priority to sequences for PUCCH format 0

| HARQ-ACK Value | {0, 0} | {0, 1} | {1, 1} | {1, 0} |
|---|---|---|---|---|
| Sequence cyclic shift | $m_{cs} = 11$ | $m_{cs} = 2$ | $m_{cs} = 5$ | $m_{cs} = 8$ |

In one implementation, to transmit a negative SR and a PUCCH with at most two HARQ-ACK information bits in a resource using PUCCH format 0, the UE may transmit the PUCCH in the resource using PUCCH format 0 for HARQ-ACK information as described in Subclause 9.2.3 of TS 38.213.

In one implementation, the different cyclic shifts for positive SRs with different priorities method may be applied to HARQ-ACK codebooks with different service types. Thus, the same method can be used for both slot level HARQ-ACK codebook and subslot level HARQ-ACK codebook.

In another implementation, the different cyclic shifts for positive SRs with different priorities method may be applied to slot level HARQ-ACK codebooks only. For subslot level HARQ-ACK codebook, only SR with high priority is reported using the cyclic shift with a positive SR as given in Table 9.2.5-1 and Table 9.2.5-1 of TS 38.213. Low priority positive SR is not multiplexed on PUCCH configured for subslot based HARQ-ACK. In general, different methods may be used based on the type of HARQ-ACK codebook and the SR priority, as given in details below.

In another method (Method 2) different handling may be applied for different HARQ-ACK codebooks and different SR priorities.

With different HARQ-ACK codebooks for different service types, in some implementations, subslot level HARQ-ACK codebooks for low latency services may have higher priorities than slot level HARQ-ACK codebooks. Similarly, in some implementations, an SR with high priority is more important than an SR with low priority. Thus, the handling of SR priority may be jointly considered with the type of HARQ-ACK codebook. In general, the following order may be considered for HARQ-ACK and SR, for the importance or priority from high to low: subslot level HARQ-ACK≥SR with high priority>slot level HARA-ACK≥SR with low priority.

Figure 7:
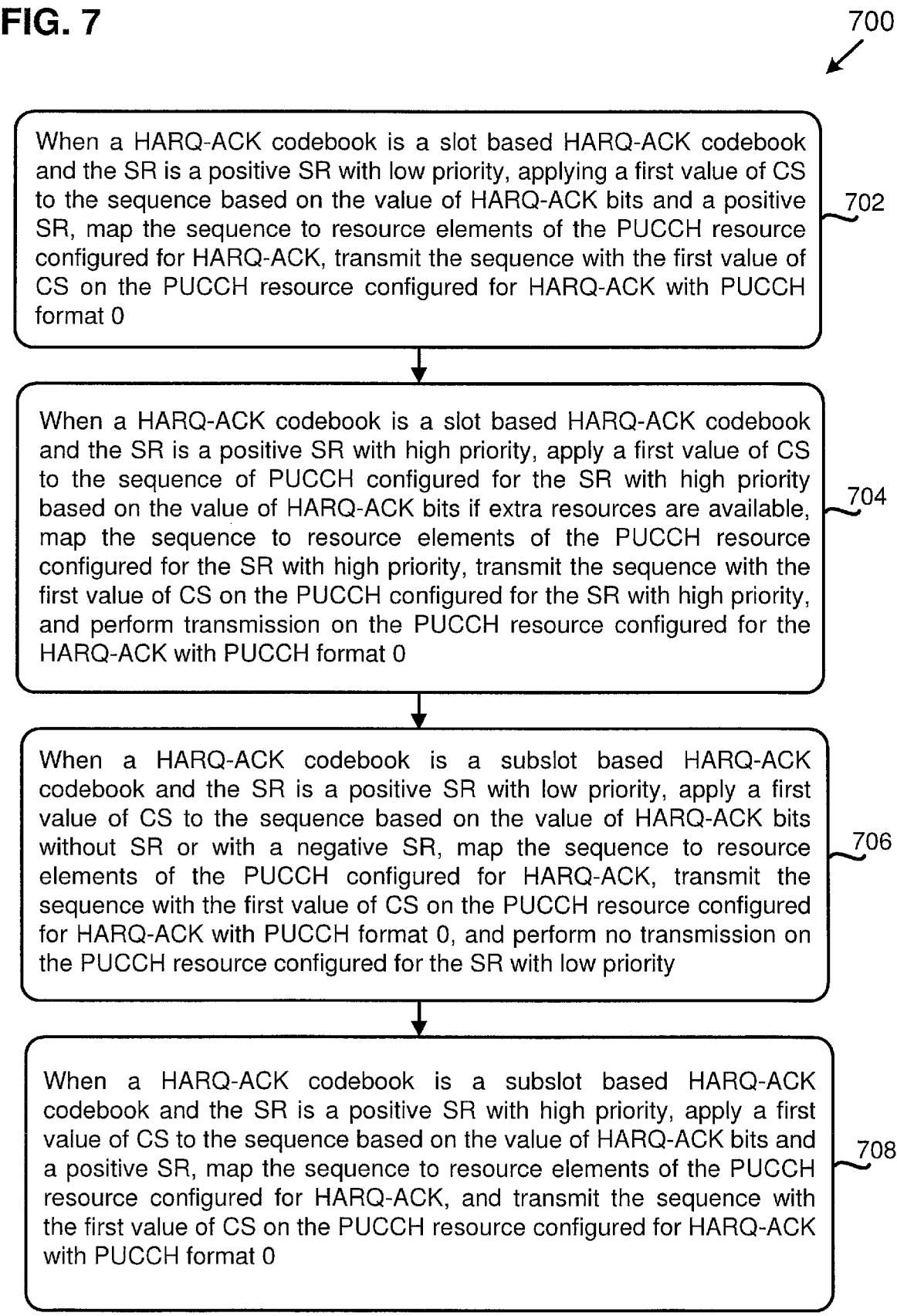
FIG. 7 is a flowchart diagram illustrating a method of a UE for handling different combinations of HARQ-ACK codebook types and positive SR priorities, in accordance with example implementations of the present application.

FIG. 7 is a flowchart diagram illustrating a method of a UE for handling different combinations of HARQ-ACK codebook types and positive SR priorities, in accordance with example implementations of the present application. In FIG. 7, diagram 700 includes actions 702, 704, 706, and 708.

In action 702, when the UE determines that the HARQ-ACK codebook is a slot based HARQ-ACK codebook and the SR is a positive SR with low priority, the UE may apply a first value of CS to the sequence based on the value of HARQ-ACK bits and the positive SR, map the sequence to resource elements of the PUCCH resource configured for HARQ-ACK, and transmit the sequence with the first value of CS on the PUCCH format 0 resource configured for HARQ-ACK. The first value of CS with a positive SR can be the same as in Table 9.2.5-1 and Table 9.2.5-1 of TS 38.213.

In action 704, when the UE determines that the HARQ-ACK codebook is a slot based HARQ-ACK codebook and the SR is a positive SR with high priority, the UE may apply a first value of CS to the sequence of PUCCH configured for the positive SR with high priority based on the value of HARQ-ACK bits if extra resources are available, map the sequence to resource elements of the PUCCH resource configured for the positive SR with high priority, transmit the sequence with the first value of CS on the PUCCH configured for the SR with high priority, and perform no transmission on the PUCCH format 0 resource configured for the HARQ-ACK.

In action 706, when the UE determines that the HARQ-ACK codebook is a subslot based HARQ-ACK codebook and the SR is a positive SR with low priority, the UE may apply a first value of CS to the sequence based on the value of HARQ-ACK bits without SR or with a negative SR, map the sequence to resource elements of the PUCCH configured for HARQ-ACK, transmit the sequence with the first value of CS on the PUCCH format 0 resource configured for HARQ-ACK, and perform no transmission on the PUCCH resource configured for the positive SR with low priority. In another word, the positive SR with low priority is ignored, and not reported together with subslot based HARQ-ACK on PUCCH format 0.

In action 708, when the UE determines that the HARQ-ACK codebook is a subslot based HARQ-ACK codebook and the SR is a positive SR with high priority, the UE may apply a first value of CS to the sequence based on the value of HARQ-ACK bits and the positive SR, map the sequence to resource elements of the PUCCH resource configured for HARQ-ACK, and transmit the sequence with the first value of CS on the PUCCH resource configured for HARQ-ACK with format 0. The first value of CS with a positive SR can be the same as in Table 9.2.5-1 and Table 9.2.5-1 of TS 38.213.

For a HARQ-ACK codebook at slot level, according to one approach, the current cyclic shift method is used for a positive SR with low priority (e.g., action 702), while for a positive SR with high priority, the PUCCH configured for the SR with high priority is transmitted, and the PUCCH configured for HARQ-ACK is not transmitted (e.g., action 704). The slot level HARQ-ACK codebook is also known as legacy HARQ-ACK codebook, low priority HARQ-ACK codebook, HARQ-ACK codebook for eMBB, or HARQ-ACK codebook for a first service type, etc. The PUCCH resources for slot level HARQ-ACK codebook are also configured at slot level. Only one PUCCH carrying slot level HARQ-ACK can be transmitted in a slot.

In one implementation, to transmit a PUCCH with a positive SR with low priority and at most two HARQ-ACK information bits in a resource using PUCCH format 0 configured for a slot level HARQ-ACK codebook, the UE may transmit the PUCCH in the resource using PUCCH format 0 in PRB(s) for HARQ-ACK information as described in Subclause 9.2.3 of TS 38.213. The UE may determine a value of $m_0$ and $m_{cs}$ for computing a value of cyclic shift α [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 9.2.5-1 and Table 9.2.5-2, respectively.

TABLE 9.2.5-1

Mapping of values for one HARQ-ACK information bit and positive SR to sequences for PUCCH format 0

| HARQ-ACK Value | 0 | 1 |
|---|---|---|
| Sequence cyclic shift | $m_{cs} = 3$ | $m_{cs} = 9$ |

TABLE 9.2.5-2

Mapping of values for two HARQ-ACK information bits and positive SR to sequences for PUCCH format 0

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

In one implementation, to transmit a PUCCH with a positive SR with a high priority and at most two HARQ-ACK information bits in a resource using PUCCH format 0 configured for slot level HARQ-ACK codebook, the UE may transmit a PUCCH in the PUCCH resource for the corresponding SR configuration with a positive SR with the highest priority among all positive SR(s). For a positive SR transmission using PUCCH format 0, the UE may transmit the PUCCH as described in [TS 38.211] by obtaining $m_0$ as described for HARQ-ACK information in Subclause 9.2.3 of TS 38.213 and by setting $m_{cs}=0$. For a positive SR transmission using PUCCH format 1, the UE transmits the PUCCH as described in [TS 38.211] by setting b(0)=0. The PUCCH format 0 for HARQ-ACK is not transmitted (e.g., dropped).

In some implementations, the HARQ-ACK bits may be carried on the PUCCH resource configured for SR if extra resources are available in the PUCCH configuration for SR with high priority, e.g. by applying cyclic shift on the SR PUCCH sequence if format 0 is configured for the corresponding SR PUCCH resource.

For example, the UE may transmit the PUCCH in the resource using PUCCH format 0 in PRB(s) for SR info nation as described in Subclause 9.2.3 of TS 38.213. The UE may determine a value of $m_0$ and $m_{cs}$ for computing a value of cyclic shift α [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 7 and Table 8, respectively.

TABLE 7

Mapping of values for one HARQ-ACK information bit and positive SR with high priority to sequences for PUCCH format 0 on SR resource

| HARQ-ACK Value | 0 | 1 |
|---|---|---|
| Sequence cyclic shift | $m_{cs} = 3$ | $m_{cs} = 9$ |

TABLE 8

Mapping of values for two HARQ-ACK information bits and positive SR with high priority to sequences for PUCCH format 0 on SR resource

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

For a HARQ-ACK codebook at slot level, according to another approach, different configurations of PUCCH for SR with high priority may be applied to HARQ-ACK PUCCH transmission.

For example, the PUCCH for an SR with high priority may be configured with higher transmit power than that of a PUCCH for an SR with low priority and a PUCCH for slot based HARQ-ACK.

For a positive SR with low priority, the PUCCH configured for the HARQ-ACK is transmitted with the current cyclic shift method and the configured HARQ-ACK PUCCH transmit power.

For a positive SR with high priority, the PUCCH configured for the HARQ-ACK is transmitted with the current cyclic shift method, but the transmission power of the PUCCH configured for the HARQ-ACK is boosted to the configured transmit power for the PUCCH configured for an SR with high priority. For example, the base station (e.g., a gNB) may transmit, by using higher layer signaling, information used for indicating a value used for boosting the transmission power for PUCCH of SR with high priority.

Figure 8:
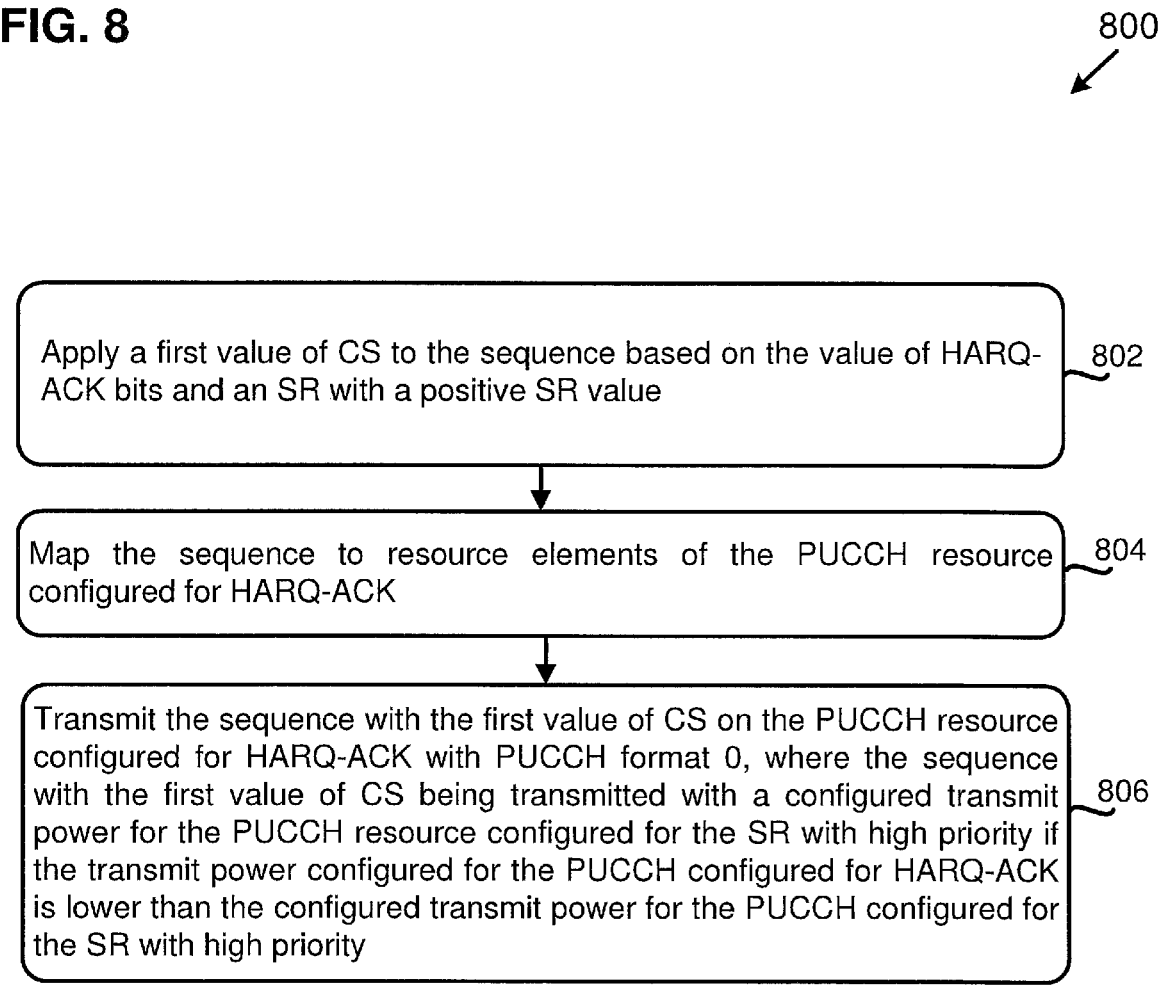
FIG. 8 is a flowchart diagram illustrating a method of a UE for boosting transmission power for an SR with high priority, in accordance with example implementations of the present application.

In FIG. 8, flowchart 800 includes actions 802, 804, and 806. When it is determined that the HARQ-ACK codebook is a slot-based HARQ-ACK codebook, and the SR is determined to be a positive SR with high priority, the UE may apply a first value of CS to the sequence based on the value of HARQ-ACK bits and the positive SR (e.g., action 802), map the sequence to resource elements of the PUCCH resource configured for HARQ-ACK (e.g., action 804), and transmit the sequence with the first value of CS on the PUCCH format 0 configured for HARQ-ACK (e.g., action 806). In the present implementation, the sequence with the first value of CS being transmitted with a configured transmit power for the PUCCH configured for the SR with high priority if the transmit power configured for the PUCCH configured for HARQ-ACK is lower than the configured transmit power for PUCCH configured for the SR with high priority.

For a HARQ-ACK codebook at subslot level, a higher priority should be assigned to the subslot level HARQ-ACK codebook than a HARQ-ACK codebook at slot level. Also, the HARQ-ACK codebook at subslot level should have a higher priority than an SR with low priority. Therefore, to differentiate SR priorities, HARQ-ACK and SR multiplexing is not performed for a positive SR with low priority (e.g., action 706). For a positive SR with high priority, the current cyclic shift method may be used (e.g., action 708). The subslot level HARQ-ACK codebook can be referred as high priority HARQ-ACK codebook, HARQ-ACK codebook for URLLC, or HARQ-ACK codebook for a second service type, etc. The PUCCH resources for subslot level HARQ-ACK codebook are configured at subslot level. More than one PUCCH carrying subslot level HARQ-ACK can be transmitted in a slot.

In one implementation, to transmit a positive SR with low priority and a PUCCH with at most two HARQ-ACK information bits in a resource using PUCCH format 0 configured for subslot level HARQ-ACK codebook, the UE may transmit the PUCCH in the resource using PUCCH format 0 for HARQ-ACK information as described in Subclause 9.2.3 of TS 38.213. The PUCCH for the positive SR with low priority is not transmitted (e.g., dropped).

In one implementation, to transmit a PUCCH with a positive SR with high priority and at most two HARQ-ACK information bits in a resource using PUCCH format 0 configured for subslot level HARQ-ACK codebook, the UE may transmit the PUCCH in the resource using PUCCH format 0 in PRB(s) for HARQ-ACK information as described in Subclause 9.2.3 of TS 38.213. The UE may determine a value of $m_0$ and $m_{cs}$ for computing a value of cyclic shift $\alpha$ [TS 38.211] where $m_0$ is provided by higher layer parameter initialcyclicshift of PUCCH-format0, and $m_{cs}$ is determined from the value of one HARQ-ACK information bit or from the values of two HARQ-ACK information bits as in Table 9.2.5-1 and Table 9.2.5-2, respectively.

TABLE 9.2.5-1:

Mapping of values for one HARQ-ACK information bit and positive SR to sequences for PUCCH format 0

| HARQ-ACK Value | 0 | 1 |
|---|---|---|
| Sequence cyclic shift | $m_{cs} = 3$ | $m_{cs} = 9$ |

TABLE 9.2.5-2:

Mapping of values for two HARQ-ACK information bits and positive SR to sequences for PUCCH format 0

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

In one implementation, the various combinations are summarized in the Table 9 below.

TABLE 9

Handling Different Combinations of HARQ-ACK Codebook Types and SR Priorities

| | Positive SR with low priority | Positive SR with high priority |
|---|---|---|
| Slot level HARQ-ACK | Same as current method | PUCCH configured for the positive SR is transmitted, and PUCCH configured for HARQ-ACK is not transmitted; or PUCCH configured for HARQ-ACK is transmitted with higher transmit power configured for the PUCCH of the SR with high priority. |
| Subslot level HARQ-ACK | SR is not multiplexed on HARQ-ACK PUCCH. PUCCH configured for HARQ-ACK is transmitted. PUCCH configured for the positive SR is dropped. | SR with high priority is multiplexed with HARQ-ACK, and transmitted on HARQ-ACK PUCCH with a cyclic shift |

As described above, the PUCCH resource and the cyclic shift index applied on the PUCCH sequence for the positive SR with high priority may be determined (e.g., changed) based on whether the positive SR with high priority is multiplexed with Slot level HARQ-ACK or Subslot level HARQ-ACK. For example, when a positive SR with high priority is multiplexed with Slot level HARQ-ACK, the cyclic shift index indicated by Table 3 and Table 4 is applied on the PUCCH resource configured for the SR with high priority. When a positive SR with high priority is multiplexed with Subslot level HARQ-ACK, the cyclic shift index indicated by Table 9.2.5-1 and Table 9.2.5-2 is applied on PUCCH resource configured for HARQ-ACK. In various implementations of the present application, Slot level HARQ-ACK and Subslot HARQ-ACK may be identified by using RNTI and/or DCI in DL assignment.

In yet another method (Method 3), no change is required at the UE side, but the gNB should have different assumptions when the SR priority is known at physical layer.

The current cyclic shift is used to report a positive SR with low priority or a positive SR with high priority. No SR differentiation at UE side. But the gNB should assume that among the SR(s) that overlap with the HARQ-ACK PUCCH, the SR with the highest priority is triggered.

<Summary>

In one example, a user equipment (UE) comprising: processing circuitry configured to: determine that up to 2 bits of a hybrid automatic repeat request-acknowledgment (HARQ-ACK)that are to be reported on a physical uplink control channel (PUCCH) resource configured for HARQ-ACK with PUCCH format 0, and at least one PUCCH resource configured for a scheduling request (SR) having a positive SR value overlapping with the PUCCH resource configured for HARQ-ACK with PUCCH format 0; determine a type of a HARQ-ACK codebook; determine an SR with positive value and a priority of the SR; determine a PUCCH resource selected between the PUCCH resource configured for HARQ-ACK and the PUCCH resource configured for the SR; determine a sequence with a value of cyclic shift (CS) on the selected PUCCH resource, the value of CS being determined based on the value of HARQ-ACK bits and the priority of the SR; and transmitting circuitry configured to transmit the sequence with the value of CS on the selected PUCCH resource.

In one example, the UE, wherein: the priority of the SR is determined based on the highest priority among all positive SRs whose PUCCH resources overlap with the PUCCH resource configured for HARQ-ACK; and the priority of the SR is determined at least by the periodicity of the SR PUCCH resource configuration.

In one example, the UE, wherein: the priority of the SR is considered as either a first priority or a second priority; the SR with the first priority is an SR with high priority; the SR with the second priority is an SR with low priority.

In one example, the UE, wherein: when the SR is a positive SR with low priority, the processing circuitry is configured to: apply a first value of CS to the sequence based on the value of the HARQ-ACK bits and a positive SR with low priority; map the sequence to resource elements of the PUCCH resource configured for HARQ-ACK; when the SR is a positive SR with high priority, the processing circuitry is configured to: apply a second value of CS to the sequence based on value of HARQ-ACK bits and a positive SR with high priority; and map the sequence to resource elements of the PUCCH resource configured for HARQ-ACK; wherein the first value of the CS and the second value CS are different.

In one example, the UE, wherein the transmitting circuitry is configured to transmit the sequence with the value of CS on the PUCCH resource configured for HARQ-ACK.

In one example, the UE, wherein: the SR having a low priority or second priority is corresponding to a first logical channel, and the SR having a high priority or first priority is corresponding to a second logical channel; the first logical channel is corresponding to a first traffic type, and the second logical channel is corresponding to a second traffic type.

In one example, the UE, wherein the first traffic service type is an enhanced mobile broadband (eMBB) service type, and the second traffic service type is an ultra-reliable and low latency (URLLC) service type.

In one example, the UE, wherein: the type of the HARQ-ACK codebook is either a first HARQ-ACK codebook or a second HARQ-ACK codebook; the first HARQ-ACK codebook is a slot based HARQ-ACK codebook; the second HARQ-ACK codebook is a sub-slot based HARQ-ACK codebook; the type of HARQ-ACK codebook is identified based on Radio Network Temporary Identifier (RNTI) and PUCCH resource configurations.

In one example, the UE, wherein: when the HARQ-ACK codebook is the slot based HARQ-ACK codebook, and the SR is a positive SR with low priority, the processing circuitry is configured to: apply a first value of CS to the sequence based on the value of HARQ-ACK bits and a positive SR; map the sequence to resource elements of the PUCCH resource configured for HARQ-ACK; the transmitting circuitry is configured to:

transmit the sequence with the first value of CS on the PUCCH resource configured for HARQ-ACK with PUCCH format 0.

In one example, the UE, wherein: when the HARQ-ACK codebook is a slot based HARQ-ACK codebook, and the SR is a positive SR with high priority, the processing circuitry is configured to: apply a first value of CS to the sequence of PUCCH configured for the SR with high priority based on the value of HARQ-ACK bits if extra resources are available; map the sequence to resource elements of the PUCCH resource configured for the SR with high priority; the transmitting circuitry is configured to: transmit the sequence with the first value of CS on the PUCCH configured for the SR with high priority; perform no transmission on the PUCCH resource configured for the HARQ-ACK with PUCCH format 0.

In one example, the UE, wherein: when the HARQ-ACK codebook is a sub-slot HARQ-ACK codebook, and the SR is a positive SR with low priority, the processing circuitry is configured to: apply a first value of CS to the sequence based on the value of HARQ-ACK bits without SR or with a negative SR; map the sequence to resource elements of the PUCCH configured for HARQ-ACK; the transmitting circuitry is configured to: transmit the sequence with the first value of CS on the PUCCH resource configured for HARQ-ACK with PUCCH format 0; perform no transmission on the PUCCH resource configured for the SR with low priority.

In one example, the UE, wherein: when the HARQ-ACK codebook is a sub-slot HARQ-ACK codebook, and the SR is a positive SR with high priority, the processing circuitry is configured to: apply a first value of CS to the sequence based on the values of HARQ-ACK bits and a positive SR; map the sequence to resource elements of the PUCCH resource configured for HARQ-ACK; the transmitting circuitry is configured to: transmit the sequence with the first value of CS on the PUCCH resource configured for HARQ-ACK with PUCCH format 0.

In one example, the UE, wherein: when the HARQ-ACK codebook is a slot-based HARQ-ACK codebook, and the SR is a positive SR with high priority, the processing circuitry is configured to: apply a first value of CS to the sequence based on the value of HARQ-ACK bits and a positive SR; map the sequence to resource elements of the PUCCH resource configured for HARQ-ACK; the transmitting circuitry is configured to: transmit the sequence with the first value of CS on the PUCCH resource configured for HARQ-ACK with PUCCH format 0; wherein the sequence with the first value of CS being transmitted with a configured transmit power for the PUCCH resource configured for the SR with high priority if the transmit power configured for the PUCCH configured for HARQ-ACK is lower than the configured transmit power for the PUCCH configured for the SR with high priority.

In one example, a method by a user equipment (UE), the method comprising: determining, by processing circuitry, that up to 2 bits of a hybrid automatic repeat request-acknowledgment (HARQ-ACK)that are reported on a physical uplink control channel (PUCCH) configured for HARQ-ACK with PUCCH format 0, and at least one PUCCH resource configured for a scheduling request (SR) having a positive SR value overlapping with the PUCCH resource configured for HARQ-ACK with PUCCH format 0; determining, by the processing circuitry, a type of a HARQ-ACK codebook; determining, by the processing circuitry, a SR with positive value and a priority of the SR; determining, by the processing circuitry, a PUCCH resource selected between the PUCCH resource configured for HARQ-ACK and the PUCCH resource configured for the SR; determining, by the processing circuitry, a sequence with a value of cyclic shift (CS) on the selected PUCCH resource, the value of CS being determined based on the value of HARQ-ACK bits and the priority of the SR; transmitting, by transmitting circuity, the sequence with the value of CS on the selected PUCCH resource.

In one example, the method, wherein: the priority of the SR is determined based on the highest priority among all positive SRs whose PUCCH resources overlap with the PUCCH resource configured for HARQ-ACK; and the priority of the SR is determined at least by the periodicity of the SR PUCCH resource configuration.

In one example, the method, wherein: the priority of an SR is considered as either a first priority or a second priority; the SR with the first priority is an SR with high priority; the SR with the second priority is an SR with low priority.

In one example, the method, further comprising: when the SR is a positive SR with low priority: apply a first value of CS to the sequence based on the value of the HARQ-ACK bits and a positive SR with low priority; map the sequence to resource elements of the PUCCH resource configured for HARQ-ACK; when the SR is a positive SR with high priority: apply a second value of CS to the sequence based on value of HARQ-ACK bits and a positive SR with high priority; and map the sequence to resource elements of the PUCCH resource configured for HARQ-ACK; wherein the first value of the CS and the second value CS are different.

In one example, the method, wherein the transmitting circuitry is configured to transmit the sequence with the value of CS on the PUCCH resource configured for HARQ-ACK.

In one example, the method, wherein: the SR having a low priority or second priority is corresponding to a first logical channel, and the SR having a high priority or first priority is corresponding to a second logical channel; the first logical channel is corresponding to a first traffic type, and the second logical channel is corresponding to a second traffic type.

In one example, the method, wherein the first traffic service type is an enhanced mobile broadband (eMBB) service type, and the second traffic service type is an ultra-reliable and low latency (URLLC) service type.

In one example, the method, wherein: the type of the HARQ-ACK codebook is either a first HARQ-ACK codebook or a second HARQ-ACK codebook; the first HARQ-ACK codebook is a slot based HARQ-ACK codebook; the second HARQ-ACK codebook is a sub-slot based HARQ-ACK codebook; the type of HARQ-ACK codebook is identified based on Radio Network Temporary Identifier (RNTI) and PUCCH resource configurations.

In one example, the method, wherein: when the HARQ-ACK codebook is the slot based HARQ-ACK codebook, and the SR is determined to be a positive SR with low priority, the method further comprising: applying a first value of CS to the sequence based on the value of HARQ-ACK bits and a positive SR; mapping the sequence to resource elements of the PUCCH resource configured for HARQ-ACK; transmitting the sequence with the first value of CS on the PUCCH resource configured for HARQ-ACK with PUCCH format 0.

In one example, the method, wherein: when the HARQ-ACK codebook is a slot based HARQ-ACK codebook, and the SR is determined to be a positive SR with high priority, the method further comprising: applying a first value of CS to the sequence of PUCCH configured for the SR with high priority based on the value of HARQ-ACK bits if extra resources are available; mapping the sequence to resource elements of the PUCCH resource configured for the SR with high priority; transmitting the sequence with the first value of CS on the PUCCH configured for the SR with high priority; performing no transmission on the PUCCH resource configured for the HARQ-ACK with PUCCH format 0.

In one example, the method, wherein: when the HARQ-ACK codebook is a sub-slot HARQ-ACK codebook, and the SR is determined to be a positive SR with low priority, the method further comprising: applying a first value of CS to the sequence based on the value of HARQ-ACK bits without SR or with a negative SR; mapping the sequence to resource elements of the PUCCH configured for HARQ-ACK; transmitting the sequence with the first value of CS on the PUCCH resource configured for HARQ-ACK with PUCCH format 0; performing no transmission on the PUCCH resource configured for the SR with low priority.

In one example, the method, wherein: when the HARQ-ACK codebook is a sub-slot HARQ-ACK codebook, and the SR is determined to be a positive SR with high priority, the method further comprising: applying a first value of CS to the sequence based on the values of HARQ-ACK bits and a positive SR; mapping the sequence to resource elements of the PUCCH resource configured for HARQ-ACK; the transmitting circuitry is configured to: transmitting the sequence with the first value of CS on the PUCCH resource configured for HARQ-ACK with PUCCH format 0.

In one example, the method, wherein: when the HARQ-ACK codebook is a slot-based HARQ-ACK codebook, and the SR is determined to be a positive SR with high priority, the method further comprising: applying a first value of CS to the sequence based on the value of HARQ-ACK bits and a positive SR; mapping the sequence to resource elements of the PUCCH resource configured for HARQ-ACK; transmitting the sequence with the first value of CS on the PUCCH resource configured for HARQ-ACK with PUCCH format 0; wherein the sequence with the first value of CS being transmitted with a configured transmit power for the PUCCH resource configured for the SR with high priority if the transmit power configured for the PUCCH configured for HARQ-ACK is lower than the configured transmit power for the PUCCH configured for the SR with high priority.

In one example, a user equipment (UE) comprising: processing circuitry configured to: determine that up to 2 bits of a hybrid automatic repeat request-acknowledgment (HARQ-ACK)that are to be reported on a physical uplink control channel (PUCCH) resource configured for HARQ-ACK with PUCCH format 0, and at least one PUCCH resource configured for a scheduling request (SR) having a positive SR value overlapping with the PUCCH resource configured for HARQ-ACK with PUCCH format 0; determine a type of a HARQ-ACK codebook; determine an SR with positive value and a priority of the SR; determine a PUCCH resource selected between the PUCCH resource configured for HARQ-ACK and the PUCCH resource configured for the SR; determine a sequence with a value of cyclic shift (CS) on the selected PUCCH resource, the value of CS being determined based on the value of HARQ-ACK bits and the priority of the SR; and transmitting circuity configured to transmit the sequence with the value of CS on the selected PUCCH resource.

In one example, the UE, wherein: the priority of the SR is determined based on the highest priority among all positive SRs whose PUCCH resources overlap with the PUCCH resource configured for HARQ-ACK; and the priority of the SR is determined by higher layer signaling explicit indicated in the SR configuration.

In one example, the UE, wherein: the priority of the SR is considered as either a first priority or a second priority; the SR with the first priority is an SR with high priority; the SR with the second priority is an SR with low priority.

In one example, the UE, wherein the transmitting circuitry is configured to transmit the sequence with the value of CS on the PUCCH resource configured for HARQ-ACK.

In one example, the UE, wherein: the SR having a low priority or second priority is corresponding to a first logical channel, and the SR having a high priority or first priority is corresponding to a second logical channel; the first logical channel is corresponding to a first traffic type, and the second logical channel is corresponding to a second traffic type.

In one example, the UE, wherein the first traffic service type is an enhanced mobile broadband (eMBB) service type, and the second traffic service type is an ultra-reliable and low latency (URLLC) service type.

In one example, the UE, wherein: the type of the HARQ-ACK codebook is either a first HARQ-ACK codebook or a second HARQ-ACK codebook; the first HARQ-ACK codebook is a slot based HARQ-ACK codebook; the second HARQ-ACK codebook is a sub-slot based HARQ-ACK codebook; the type of HARQ-ACK codebook is identified based on Radio Network Temporary Identifier (RNTI) and PUCCH resource configurations.

In one example, the UE, wherein: when the HARQ-ACK codebook is the slot based HARQ-ACK codebook, and the SR is a positive SR with low priority, the processing circuitry is configured to: apply a first value of CS to the sequence based on the value of HARQ-ACK bits and a positive SR; map the sequence to resource elements of the PUCCH resource configured for HARQ-ACK; the transmitting circuitry is configured to: transmit the sequence with the first value of CS on the PUCCH resource configured for HARQ-ACK with PUCCH format 0.

In one example, the UE, wherein: when the HARQ-ACK codebook is a slot based HARQ-ACK codebook, and the SR is a positive SR with high priority, the processing circuitry is configured to: apply a first value of CS to the sequence of PUCCH configured for the SR with high priority; map the sequence to resource elements of the PUCCH resource configured for the SR with high priority; the transmitting circuitry is configured to: transmit the sequence with the first value of CS on the PUCCH configured for the SR with high priority; perform no transmission on the PUCCH resource configured for the HARQ-ACK with PUCCH format 0.

In one example, the UE, wherein: when the HARQ-ACK codebook is a sub-slot HARQ-ACK codebook, and the SR is a positive SR with low priority, the processing circuitry is configured to: apply a first value of CS to the sequence based on the value of HARQ-ACK bits without SR or with a negative SR; map the sequence to resource elements of the PUCCH configured for HARQ-ACK; the transmitting circuitry is configured to: transmit the sequence with the first value of CS on the PUCCH resource configured for HARQ-ACK with PUCCH format 0; perform no transmission on the PUCCH resource configured for the SR with low priority.

In one example, the UE, wherein: when the HARQ-ACK codebook is a sub-slot HARQ-ACK codebook, and the SR is a positive SR with high priority, the processing circuitry is configured to: apply a first value of CS to the sequence based on the values of HARQ-ACK bits and a positive SR; map the sequence to resource elements of the PUCCH resource configured for HARQ-ACK; the transmitting circuitry is configured to: transmit the sequence with the first value of CS on the PUCCH resource configured for HARQ-ACK with PUCCH format 0.

In one example, a method by a user equipment (UE), the method comprising: determining, by processing circuitry, that up to 2 bits of a hybrid automatic repeat request-acknowledgment (HARQ-ACK)that are reported on a physical uplink control channel (PUCCH) configured for HARQ-ACK with PUCCH format 0, and at least one PUCCH resource configured for a scheduling request (SR) having a positive SR value overlapping with the PUCCH resource configured for HARQ-ACK with PUCCH format 0; determining, by the processing circuitry, a type of a HARQ-ACK codebook; determining, by the processing circuitry, a SR with positive value and a priority of the SR; determining, by the processing circuitry, a PUCCH resource selected between the PUCCH resource configured for HARQ-ACK and the PUCCH resource configured for the SR; determining, by the processing circuitry, a sequence with a value of cyclic shift (CS) on the selected PUCCH resource, the value of CS being determined based on the value of HARQ-ACK bits and the priority of the SR; transmitting, by transmitting circuity, the sequence with the value of CS on the selected PUCCH resource.

In one example, the method, wherein: the priority of the SR is determined based on the highest priority among all positive SRs whose PUCCH resources overlap with the PUCCH resource configured for HARQ-ACK; and the priority of the SR is determined by higher layer signaling explicit indicated in the SR configuration.

In one example, the method, wherein: the priority of an SR is considered as either a first priority or a second priority; the SR with the first priority is an SR with high priority; the SR with the second priority is an SR with low priority.

In one example, the method, wherein the transmitting circuitry is configured to transmit the sequence with the value of CS on the PUCCH resource configured for HARQ-ACK.

In one example, the method, wherein: the SR having a low priority or second priority is corresponding to a first logical channel, and the SR having a high priority or first priority is corresponding to a second logical channel; the first logical channel is corresponding to a first traffic type, and the second logical channel is corresponding to a second traffic type.

In one example, the method, wherein the first traffic service type is an enhanced mobile broadband (eMBB) service type, and the second traffic service type is an ultra-reliable and low latency (URLLC) service type.

In one example, the method, wherein: the type of the HARQ-ACK codebook is either a first HARQ-ACK codebook or a second HARQ-ACK codebook; the first HARQ-ACK codebook is a slot based HARQ-ACK codebook; the second HARQ-ACK codebook is a sub-slot based HARQ-ACK codebook; the type of HARQ-ACK codebook is identified based on Radio Network Temporary Identifier (RNTI) and PUCCH resource configurations.

In one example, the method, wherein: when the HARQ-ACK codebook is the slot based HARQ-ACK codebook, and the SR is determined to be a positive SR with low priority, the method further comprising: applying a first value of CS to the sequence based on the value of HARQ-ACK bits and a positive SR; mapping the sequence to resource elements of the PUCCH resource configured for HARQ-ACK; transmitting the sequence with the first value of CS on the PUCCH resource configured for HARQ-ACK with PUCCH format 0.

In one example, the method, wherein: when the HARQ-ACK codebook is a slot based HARQ-ACK codebook, and the SR is determined to be a positive SR with high priority, the method further comprising: applying a first value of CS to the sequence of PUCCH configured for the SR with high priority; mapping the sequence to resource elements of the PUCCH resource configured for the SR with high priority; transmitting the sequence with the first value of CS on the PUCCH configured for the SR with high priority; performing no transmission on the PUCCH resource configured for the HARQ-ACK with PUCCH format 0.

In one example, the method, wherein: when the HARQ-ACK codebook is a sub-slot HARQ-ACK codebook, and the SR is determined to be a positive SR with low priority, the method further comprising: applying a first value of CS to the sequence based on the value of HARQ-ACK bits without SR or with a negative SR; mapping the sequence to resource elements of the PUCCH configured for HARQ-ACK; transmitting the sequence with the first value of CS on the PUCCH resource configured for HARQ-ACK with PUCCH format 0; performing no transmission on the PUCCH resource configured for the SR with low priority.

In one example, the method, wherein: when the HARQ-ACK codebook is a sub-slot HARQ-ACK codebook, and the SR is determined to be a positive SR with high priority, the method further comprising: applying a first value of CS to the sequence based on the values of HARQ-ACK bits and a positive SR; mapping the sequence to resource elements of the PUCCH resource configured for HARQ-ACK; the transmitting circuitry is configured to: transmitting the sequence with the first value of CS on the PUCCH resource configured for HARQ-ACK with PUCCH format 0.

What is claimed is:

1. A user equipment (UE) comprising:
processing circuitry; and
transmission circuitry,
wherein the processing circuitry configured to,
determine that a hybrid automatic repeat request-acknowledgment (HARQ-ACK) codebook of up to 2 bits is to be reported on a physical uplink control channel (PUCCH) resource with PUCCH format 0, and at least one PUCCH resource configured for a scheduling request (SR) having a positive SR value overlaps with the PUCCH resource configured for HARQ-ACK with PUCCH format 0, and
determine a priority of the HARQ-ACK codebook and a priority of the SR with positive value, wherein the HARQ-ACK codebook is either a low priority HARQ-ACK codebook or a high priority HARQ-ACK codebook, and the priority of SR is explicitly indicated by higher layer signaling in the SR PUCCH resource configuration with either an SR with high priority or an SR with low priority, and
wherein the transmission circuitry configured to,
in a case that the HARQ-ACK codebook and the positive SR have different priorities, transmit the PUCCH with the high priority UCI, and cancel the PUCCH with the low priority UCI, and
in a case that the HARQ-ACK codebook and the positive SR have the same priority, multiplex the HARQ-ACK and SR, and transmit on the PUCCH resource for HARQ-ACK with PUCCH format 0 by a cyclic shift representing the positive SR.

2. The UE according to claim 1, wherein the transmission circuitry configured to,
in a case that the HARQ-ACK codebook is a low priority HARQ-ACK codebook, and the SR is a positive SR with high priority, transmit the PUCCH for positive SR with high priority, and cancel the PUCCH with low priority HARQ-ACK codebook,
in a case that the HARQ-ACK codebook is a high priority HARQ-ACK codebook, and the SR is a positive SR with low priority, transmit the PUCCH for high priority HARQ-ACK codebook, and cancel the PUCCH with positive SR with low priority, and
in a case that the HARQ-ACK codebook is a low priority HARQ-ACK codebook and the SR is a positive SR with low priority, or in a case that the HARQ-ACK codebook is a high priority HARQ-ACK codebook and the SR is a positive SR with high priority, multiplex the HARQ-ACK and SR and transmit on the PUCCH resource for HARQ-ACK with PUCCH format 0 by a cyclic shift representing the positive SR.

3. A base station comprising:
processing circuitry; and
receiving circuitry,
wherein the processing circuitry configured to,
determine that a hybrid automatic repeat request-acknowledgment (HARQ-ACK) codebook of up to 2 bits is to be reported on a physical uplink control channel (PUCCH) resource with PUCCH format 0, and at least one PUCCH resource configured for a scheduling request (SR) having a positive SR value overlaps with the PUCCH resource configured for HARQ-ACK with PUCCH format 0, and
determine a priority of the HARQ-ACK codebook and a priority of the SR with positive value, wherein the HARQ-ACK codebook is either a low priority HARQ-ACK codebook or a high priority HARQ-ACK codebook, and the priority of SR is explicitly indicated by higher layer signaling in the SR PUCCH resource configuration with either an SR with high priority or an SR with low priority, and
wherein the reception circuitry configured to,
in a case that the HARQ-ACK codebook and the positive SR have different priorities, receive the PUCCH with the high priority UCI, and cancel the PUCCH with the low priority UCI, and
in a case that the HARQ-ACK codebook and the positive SR have the same priority, multiplex the HARQ-ACK and SR, and transmit on the PUCCH resource for HARQ-ACK with PUCCH format 0 by a cyclic shift representing the positive SR.

4. The base station according to claim 3, wherein the receiving circuitry configured to,
in a case that the HARQ-ACK codebook is a low priority HARQ-ACK codebook, and the SR is a positive SR with high priority, receive the PUCCH for positive SR with high priority, and cancel the PUCCH with low priority HARQ-ACK codebook,
in a case that the HARQ-ACK codebook is a high priority HARQ-ACK codebook, and the SR is a positive SR with low priority, receive the PUCCH for high priority HARQ-ACK codebook, and cancel the PUCCH with positive SR with low priority, and
in a case that the HARQ-ACK codebook is a low priority HARQ-ACK codebook and the SR is a positive SR with low priority, or in a case that the HARQ-ACK codebook is a high priority HARQ-ACK codebook and the SR is a positive SR with high priority, multiplex the HARQ-ACK and SR and transmit on the PUCCH resource for HARQ-ACK with PUCCH format 0 by a cyclic shift representing the positive SR.

5. A communication method performed by a user equipment (UE) comprising:
determining that a hybrid automatic repeat request-acknowledgment (HARQ-ACK) codebook of up to 2 bits is to be reported on a physical uplink control channel (PUCCH) resource with PUCCH format 0, and at least one PUCCH resource configured for a scheduling request (SR) having a positive SR value overlaps with the PUCCH resource configured for HARQ-ACK with PUCCH format 0;
determining a priority of the HARQ-ACK codebook and a priority of the SR with positive value, wherein the HARQ-ACK codebook is either a low priority HARQ-ACK codebook or a high priority HARQ-ACK codebook, and the priority of SR is explicitly indicated by higher layer signaling in the SR PUCCH resource configuration with either an SR with high priority or an SR with low priority;
in a case that the HARQ-ACK codebook and the positive SR have different priorities, transmitting the PUCCH with the high priority UCI, and cancel the PUCCH with the low priority UCI; and in a case that the HARQ-ACK codebook and the positive SR have the same priority, multiplexing the HARQ-ACK and SR, and transmit on the PUCCH resource for HARQ-ACK with PUCCH format 0 by a cyclic shift representing the positive SR.

* * * * *